US007853237B2

(12) United States Patent
Tokunaga

(10) Patent No.: US 7,853,237 B2
(45) Date of Patent: Dec. 14, 2010

(54) POWER SUPPLYING APPARATUS, POWER LINE COMMUNICATION APPARATUS, POWER LINE COMMUNICATION SYSTEM, AND POWER SUPPLYING METHOD

(75) Inventor: Yoshimi Tokunaga, Kumamoto (JP)

(73) Assignee: Panasonic Corporation, Osaka (JP)

( * ) Notice: Subject to any disclaimer, the term of this patent is extended or adjusted under 35 U.S.C. 154(b) by 989 days.

(21) Appl. No.: 11/645,776

(22) Filed: Dec. 27, 2006

(65) Prior Publication Data
US 2007/0149258 A1    Jun. 28, 2007

(30) Foreign Application Priority Data
Dec. 28, 2005  (JP)  ............................. 2005-377967
Apr. 21, 2006  (JP)  ............................. 2006-118070

(51) Int. Cl.
*H04M 9/00*    (2006.01)
(52) U.S. Cl. ................. 455/402; 455/550.1; 455/127.1; 455/466
(58) Field of Classification Search ................. 455/402, 455/550.1, 517, 466
See application file for complete search history.

(56) References Cited

U.S. PATENT DOCUMENTS

| 3,949,172 | A | * | 4/1976 | Brown et al. ................. 455/402 |
| 6,194,996 | B1 | * | 2/2001 | Okazaki et al. ............. 370/482 |
| 6,559,757 | B1 | * | 5/2003 | Deller et al. ................. 370/206 |
| 6,563,924 | B1 | * | 5/2003 | Cho ........................ 379/399.01 |
| 6,928,273 | B2 | * | 8/2005 | Nitta ........................ 455/127.5 |
| 6,934,170 | B2 |   | 8/2005 | Ooishi |
| 7,019,997 | B2 |   | 3/2006 | Ooishi |
| 7,146,191 | B2 | * | 12/2006 | Kerner et al. ................ 455/558 |
| 2003/0129978 | A1 | * | 7/2003 | Akiyama et al. ............. 455/426 |
| 2004/0073086 | A1 | * | 4/2004 | Abe ............................ 600/109 |
| 2005/0208825 | A1 |   | 9/2005 | Chan |
| 2007/0076676 | A1 | * | 4/2007 | Shiba ........................ 370/339 |

FOREIGN PATENT DOCUMENTS

| DE | 2508449 | 9/1975 |
| GB | 2415311 | 12/2005 |
| JP | 2000165304 | 6/2000 |
| JP | 2005175758 | 6/2005 |

OTHER PUBLICATIONS

PCT International Search Report dated May 24, 2007 with Written Opinion.

* cited by examiner

*Primary Examiner*—Huy Phan
(74) *Attorney, Agent, or Firm*—Dickinson Wright PLLC

(57) ABSTRACT

A power line communication modem within a network camera outputs a communication signal to an AC adaptor. Then, a signal superimposition and separation circuit of the AC adaptor separates a received communication signal from a DC voltage and an amplifier of the AC adaptor amplifies a signal level of the communication signal and then outputs the amplified signal to a power line through a plug. The communication signal is transmitted through a DC cable under a state in which a signal level of the communication signal is attenuated. Accordingly, even when the cable length of a DC cable is large, unnecessary radiation can be suppressed.

22 Claims, 25 Drawing Sheets

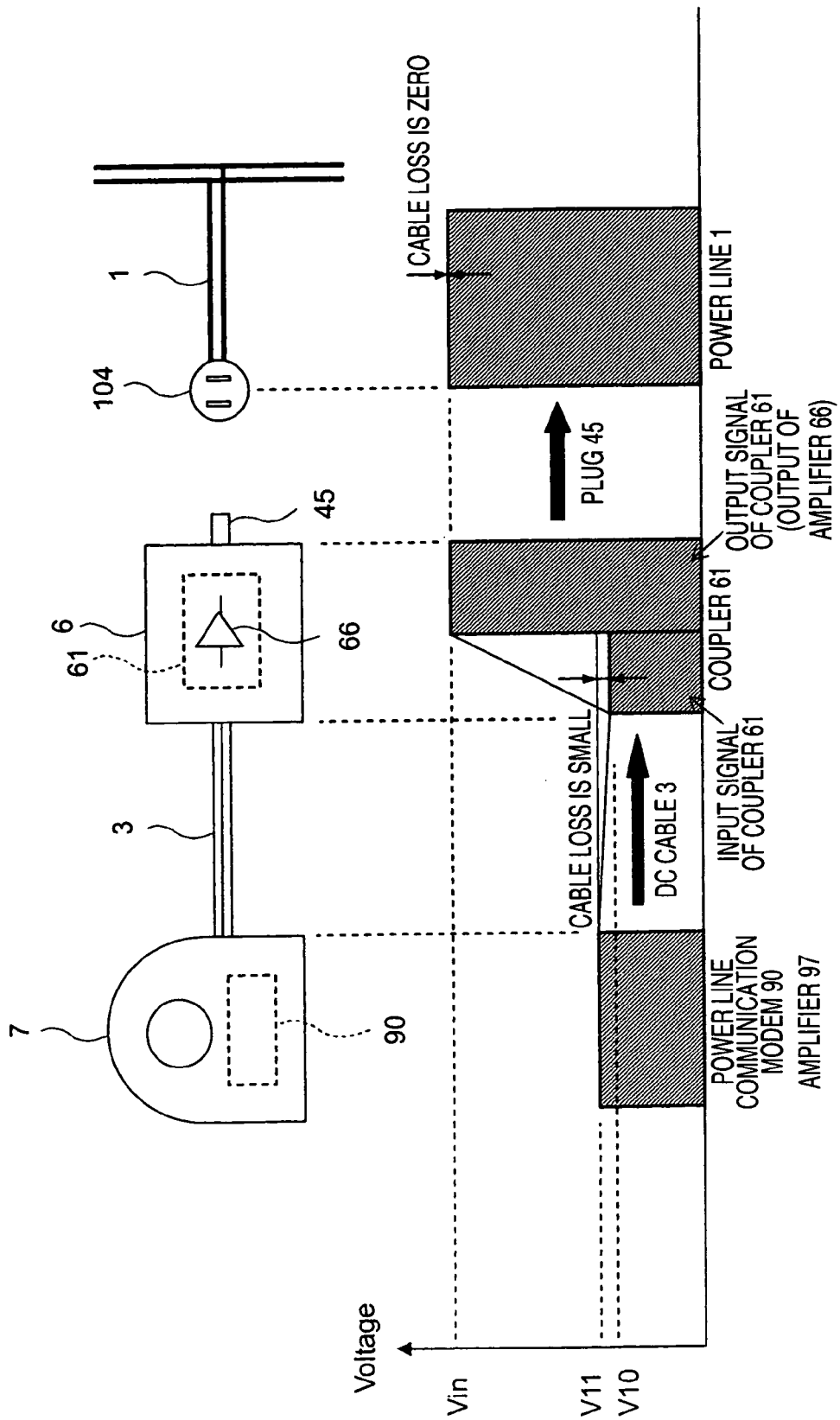

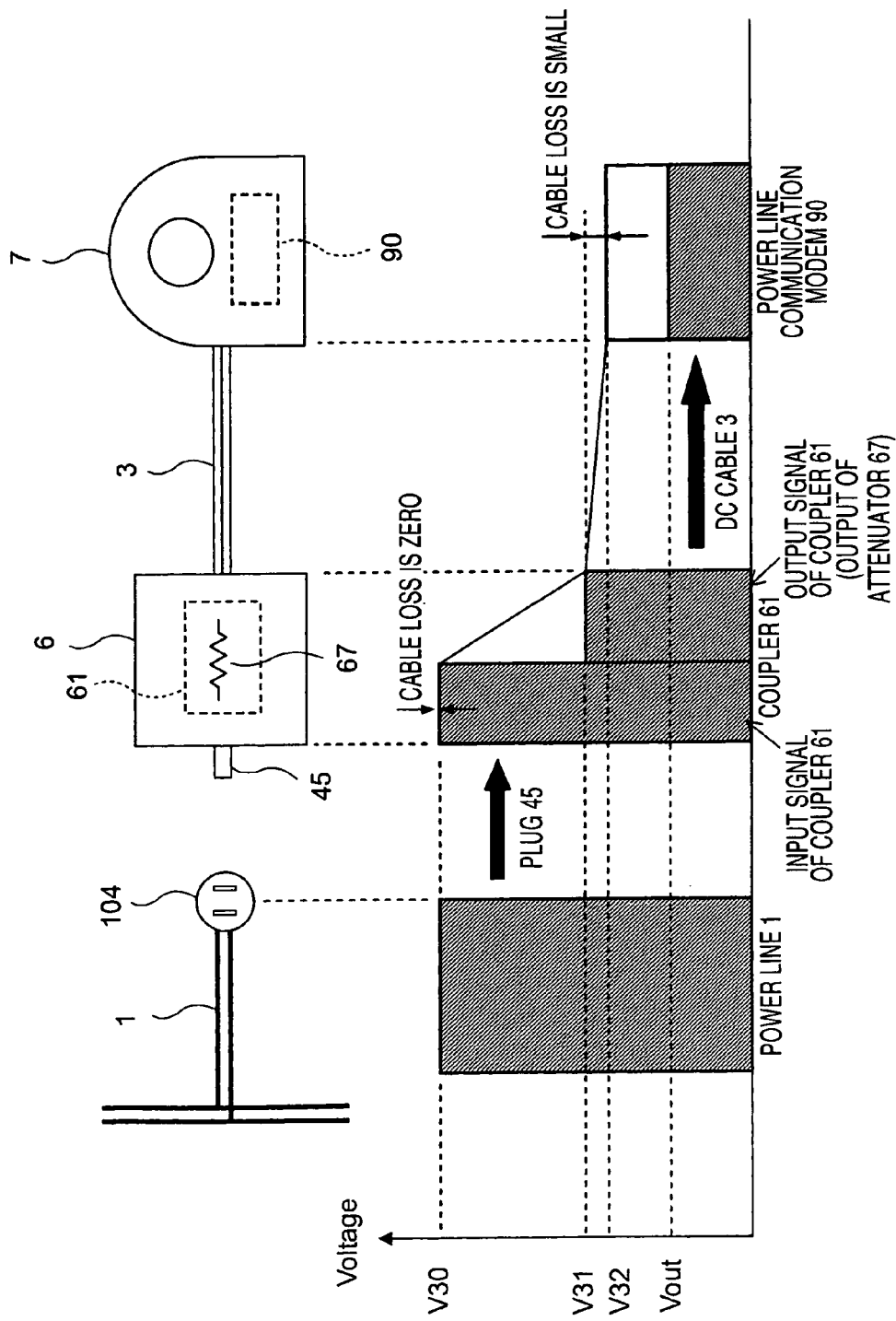

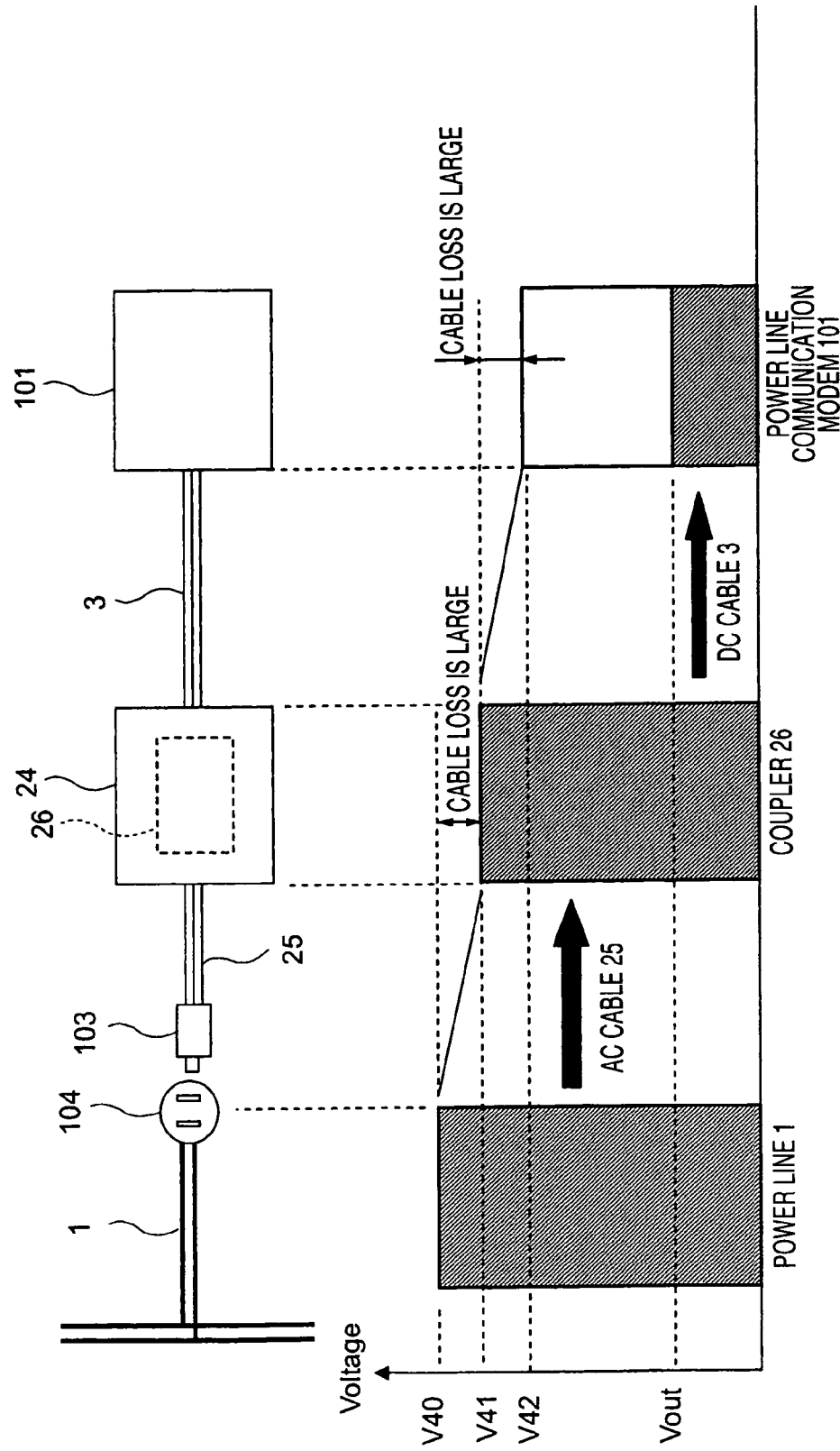

POWER SUPPLYING APPARATUS, POWER LINE COMMUNICATION APPARATUS, POWER LINE COMMUNICATION SYSTEM, AND POWER SUPPLYING METHOD

This application claims the benefit of priority under 35 USC 119 from Japanese Application Number 2005-377967, filed Dec. 28, 2005, and Japanese Application Number 2006-118070, filed Apr. 21, 2006, both incorporated herein by reference.

BACKGROUND

The present invention relates to a power supplying apparatus, a power line communication apparatus, a power line communication system, and a power supplying method which allow the power line communication apparatus to perform power line communication while suppressing unnecessary radiation occurring in a cable even when the power line communication apparatus, such as an imaging device or an image display device, is disposed at a place distant from an outlet.

In recent years, a demand for building a LAN in a small office or home in a simple and cheap way is increasing. In particular, a demand for building communication apparatuses, such as a network camera or a surveillance camera, capable of performing monitoring with a remote operation which is safe and reliable from the view point of crime prevention and security is rapidly increasing.

In order to build the LAN, a known method has been used in which a dedicated line for communication, such as Ethernet (registered trademark) is wired. In particular, since a wiring work is not required, a demand for a wireless LAN is increasing. On the other hand, in order to realize supply of power to the communication apparatuses and communication of the communication apparatuses by the use of only a power line, a variety of power line communication apparatuses have been proposed (for example, JP-A-2000-165304). The power line communication apparatus performs communication by superimposing a communication signal for power line communication using an OFDM (orthogonal frequency division multiplexing) method on a commercial AC voltage (for example, AC 120V, 60 Hz in U.S.A., AC 100V, 60 Hz or 50 Hz in Japan). For this reason, the power line communication apparatus requires an AC adaptor, which includes a converting circuit that supplies power to the communication apparatus and a coupler circuit that superimposes a power line signal on commercial AC power, and a power line communication modem built in the communication apparatus.

Hereinafter, a related power line communication apparatus will be described. FIG. 9 is a block diagram illustrating hardware of the related power line communication apparatus. In the case when a power line communication modem 101 receives a communication signal for power line communication, first, a commercial AC voltage is input from a power line 1 to an AC adaptor 24, which includes a coupler 68 and a signal superimposition and separation circuit 62, through an AC cable 25 such as a VVF cable. The AC adaptor 24 converts the input commercial AC voltage to a DC voltage. The communication signal for power line communication is superimposed on the DC voltage in the signal superimposition and separation circuit 62 through the coupler 68 and is then transmitted to the power line communication modem 101 and a communication terminal (not shown) through a DC cable 3.

On the other hand, in the case when the power line communication modem 101 transmits the communication signal for power line communication, the communication signal from the power line communication modem 101 is superimposed on the DC voltage and is then transmitted to the AC adaptor 24 through the DC cable 3. Then, the communication signal is separated from the DC voltage by the signal superimposition and separation circuit 62 of the AC adaptor 24; The separated communication signal is superimposed on the commercial AC voltage through the coupler 26 and is then output to the power line 1.

Since the imaging device, such as a network camera, or the image display device, such as a monitor, is disposed on a wall or ceiling in many cases, a cable having a length of 0.5 m to 10 m or more is frequently used. In particular, the imaging device is generally disposed at a variety of places for the purpose of crime prevention and security, and it is desirable to make a cable long so that the imaging device can be disposed at a place distant from an outlet.

However, in the case of applying the above-described power line communication apparatus to the imaging device or the image display device, it has been difficult to make an AC cable long so as to dispose the power line communication modem at a place distant from an outlet. Specifically, the AC cable is directly connected to a power line to which a variety of electrical apparatuses are connected. Accordingly, in the case when some of the electrical apparatuses generate noises, if the cable is long, the cable is affected due to the noises. As a result, a problem has occurred in that unnecessary radiation increases. In addition, since the commercial AC voltage is applied to the AC cable all the time, unnecessary radiation due to the commercial AC voltage occurs if a balancing control process is not performed.

On the other hand, it is possible to decrease the unnecessary radiation by making the DC cable long, as compared with a case in which the AC cable is long. However, in the case of simply lengthening the DC cable, a problem has occurred in that a signal level of a communication signal is attenuated. In this case, the signal level can be held to a certain degree by amplifying the signal level beforehand. However, the unnecessary radiation increases in correspondence with the amplification.

SUMMARY

The invention has been finalized in view of the drawbacks inherent in the related art, and it is an object of the invention to provide a power supplying apparatus, a power line communication apparatus, and a power line communication system, and a power supplying method capable of suppressing unnecessary radiation even when the cable length of a DC cable is set to be long.

According to an aspect of the invention, a power supplying apparatus that supplies power to a power line communication apparatus that transmits a transmission signal through a power line includes: a plug connectable to the power line; a DC cable connectable to the power line communication apparatus; a voltage converting circuit that converts an AC voltage, which is input from the power line through the plug, to a DC voltage and outputs the DC voltage to the DC cable; and a level controlling circuit that superimposes the transmission signal, which is superimposed on the DC voltage, on the AC voltage and controls a level of the transmission signal such that a level of the transmission signal superimposed on the AC voltage is higher than a level of the transmission signal superimposed on the DC voltage.

According to still another aspect of the invention, a power supplying apparatus that supplies power to a power line communication apparatus that receives a received signal through a power line includes: a plug connectable to the power line; a DC cable connectable to the power line communication apparatus; a voltage converting circuit that converts an AC voltage, which is input from the power line through the plug, to a DC voltage and outputs the DC voltage to the DC cable; and a level controlling circuit that superimposes the received signal, which is superimposed on the AC voltage, on the DC voltage and controls a level of the received signal such that a level of the received signal superimposed on the DC voltage is lower than a level of the received signal superimposed on the AC voltage.

According to still another aspect of the invention, a power supplying method of supplying power to a power line communication apparatus that transmits a transmission signal through a power line includes: converting an AC voltage, which is input from the power line through a plug, to a DC voltage; outputting the DC voltage to a cable; superimposing the transmission signal, which is superimposed on the DC voltage, on the AC voltage; and controlling a level of the transmission signal such that a level of the transmission signal superimposed on the AC voltage is higher than a level of the transmission signal superimposed on the DC voltage.

According to still another aspect of the invention, a power supplying method of supplying power to a power line communication apparatus that receives a received signal through a power line includes: converting an AC voltage, which is input from the power line through a plug, to a DC voltage; outputting the DC voltage to a cable; superimposing the received signal, which is superimposed on the AC voltage, on the DC voltage; and controlling a level of the received signal such that a level of the received signal superimposed on the DC voltage is lower than a level of the received signal superimposed on the AC voltage.

In the invention described above, the level of the transmission signal is controlled such that the level of the transmission signal superimposed on the AC voltage is higher than the level of the transmission signal superimposed on the DC voltage. Accordingly, even in the case when the cable length of a DC cable is large, the radiation occurring in the DC cable can be suppressed while securing coverage (that is, a distance by which the transmission signal reaches) of the transmission signal transmitted to the power line.

Furthermore, in the invention described above, since the level of the received signal is controlled such that the level of the received signal superimposed on the DC voltage is lower than the level of the received signal superimposed on the AC voltage, the radiation occurring in the DC cable can be suppressed even when the DC cable is long.

Furthermore, in the invention described above, the level of the transmission signal is controlled such that the level of the transmission signal superimposed on the AC voltage is higher than the level of the transmission signal superimposed on the DC voltage. Accordingly, even in the case when the cable length of a DC cable is large, the radiation occurring in the DC cable can be suppressed while securing coverage of the transmission signal transmitted to the power line.

Furthermore, in the invention described above, since the level of the received signal is controlled such that the level of the received signal superimposed on the DC voltage is lower than the level of the received signal superimposed on the AC voltage, the radiation occurring in the DC cable can be suppressed even when the DC cable is long.

BRIEF DESCRIPTION OF THE DRAWINGS

FIG. 2F is a view illustrating still another modified example of an AC adaptor.

FIG. 6A is an explanatory view illustrating a level of a transmission signal when a power line communication apparatus according to the first embodiment performs a transmission operation.

FIG. 6B is an explanatory view illustrating a level of a received signal when the power line communication apparatus according to the first embodiment performs a receiving operation.

FIG. 10B is an explanatory view illustrating a level of a received signal when the related power line communication apparatus performs a receiving operation.

DETAILED DESCRIPTION

A power line communication system includes a power line communication apparatus and an AC adaptor. The AC adaptor is an example of a power supplying apparatus. The power line communication apparatus refers to a communication apparatus that performs power line communication. Specifically, the power line communication apparatus is a communication apparatus that performs at least one of an operation of transmitting a communication signal and an operation of receiving a communication signal by the use of multi-carriers or the like. In addition, the power line communication apparatus serves as a communication apparatus that superimposes a communication signal on a commercial AC voltage (for example, AC 120V, 60 Hz in U.S.A., AC 100V, 60 Hz or 50 Hz in Japan) or separates a communication signal superimposed on AC power of a power line. In the case of performing both the transmission and receiving operations, the power line communication apparatus includes a power line communication modem that modulates and demodulates a communication signal. A modulation method includes an OFDM (orthogonal frequency division multiplexing) method or an SS (spectrum spread) method.

In embodiment of the invention, a network camera to which a power line communication system is applied will be described. The network camera is an example of an imaging device that images a photographic subject and outputs the photographic subject as image data. In the specification, a 'network camera' refers to an imaging device that outputs communication signals including image data through a network, such as a LAN (local area network). In addition, the image data refers to data used to display an image and includes digital data created by using a compression technique of a JPEG (joint photographic coding experts group) or an MPEG (moving picture coding experts group), for example. Hereinafter, embodiments of the invention will be described with reference to the accompanying drawings.

First Embodiment

Figure 1B:
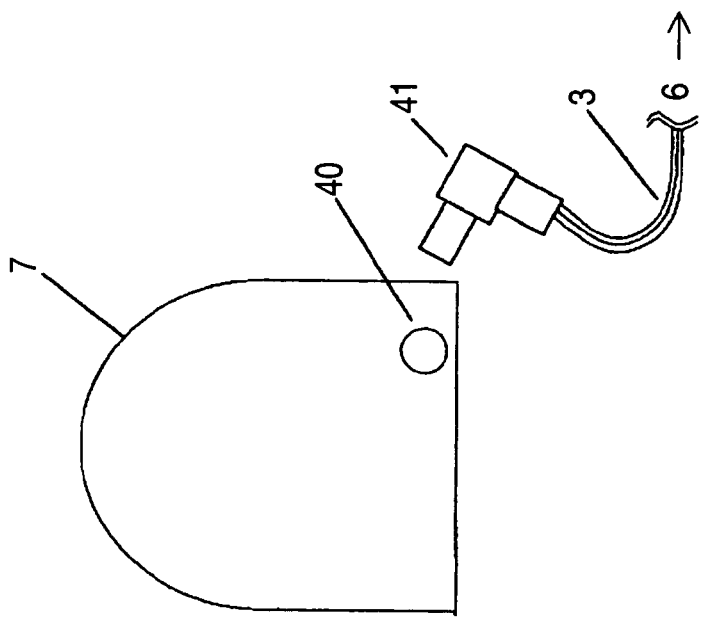
FIG. 1B is a rear view illustrating the network camera to which the power line communication system according to the first embodiment of the invention is applied.
Figure 1A:
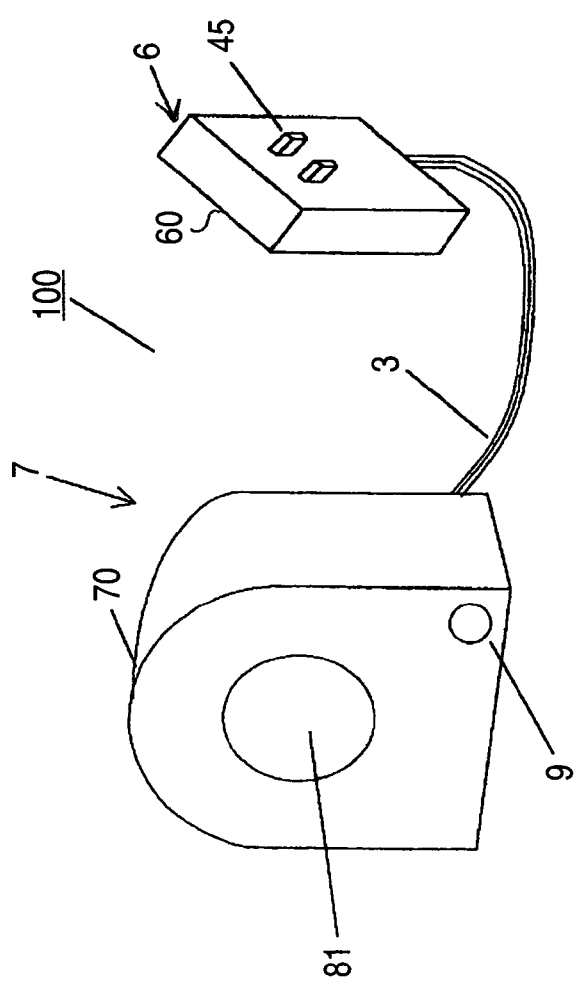
FIG. 1A is a perspective view illustrating the entire network camera to which a power line communication system according to a first embodiment of the invention is applied.

A power line communication system 100 includes a network camera 7, which is an example of a power line communication apparatus, and an AC adaptor 6. As shown in FIG. 1A, the network camera 7 has a housing 70, and a lens 81 and an indicator 9 are provided in the housing 70. Furthermore, as shown in FIG. 1B, the network camera 7 includes a DC jack 40 to which a DC cable 3 is connected. The DC cable 3 is a cable through which a DC voltage can be supplied and has a DC plug 41 on one end thereof.

As shown in FIG. 1A, the AC adaptor 6 has a body including a housing 60, and a plug 45 and a DC cable 3 are provided in the housing 60. The AC adaptor 6 is a direct plug-in type AC adaptor, and the plug 45 is directly provided on the body. Therefore, the AC adaptor 6 is directly connected to a power outlet (not shown) by means of the plug 45. In addition, the DC cable 3 is not necessarily fixed to the housing 60. For example, it is possible to prepare a separate DC plug on the other end of the DC cable 3, such that the DC cable 3 and the AC adaptor 6 are provided separately from each other.

The AC adaptor 6 and the network camera 7 are connected to each other by means of the DC cable 3 and the DC plug 41 positioned on a front end of the DC cable 41 is inserted into the DC jack 40 of the network camera 7, and thus both power supply and power line communication can be realized. The DC plug 41 is detachable from a network camera. The network camera 7 includes a lens 81 and an indicator 9 indicating the communication state of power line communication on a front surface thereof.

FIGS. 2A to 2E are perspective views illustrating an AC adaptor. Referring to FIGS. 2A to 2E, AC adaptors 6a, 6b, ..., and 6e as modified examples will be described. In the following description, if it is not necessary to distinguish the AC adaptors 6a, 6b, ..., and 6e from one another, the AC adaptors 6a, 6b, ..., and 6e are simply referred to as an 'AC adaptor 6'.

Figure 2A:
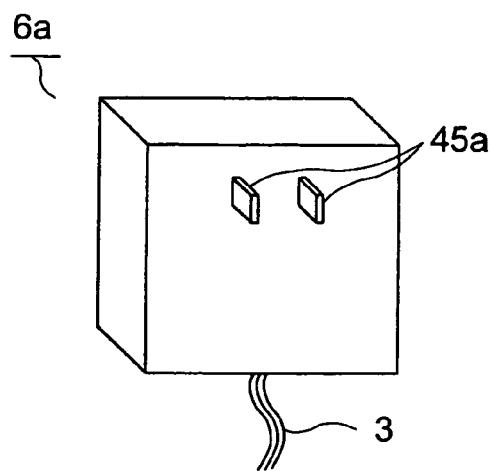
FIG. 2A is a view illustrating a modified example of an AC adaptor.
Figure 2B:
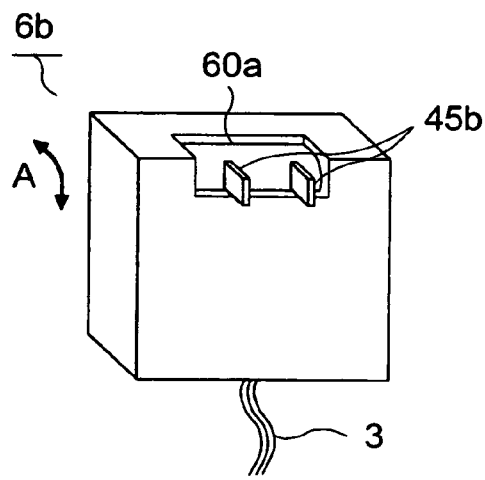
FIG. 2B is a view illustrating a modified example of an AC adaptor.

The AC adaptor 6a shown in FIG. 2A includes a plug 45a. In the AC adaptor 6b shown in FIG. 2B, a rotary part 60a is rotatably provided in the housing 60. The rotary part 60a is rotatable in the direction indicated by a solid line A. The rotary part 60a is provided with a plug 45b. Therefore, since the plug 45b is rotatable in the direction indicated by the solid line A, it is possible to make the plug 45b move with respect to the housing.

Figure 2C:
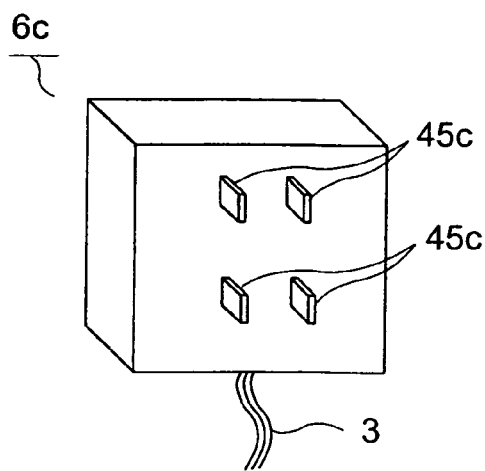
FIG. 2C is a view illustrating another modified example of an AC adaptor.

In the AC adaptor 6c shown in FIG. 2C, two plugs 45c are provided in a housing. Alternatively, three or more plugs may be provided without being limited to two plugs. That is, when inserting plugs into an outlet, the AC adaptor can be stably positioned with respect to the outlet by inserting a plurality of plugs into the outlet.

Figure 2D:
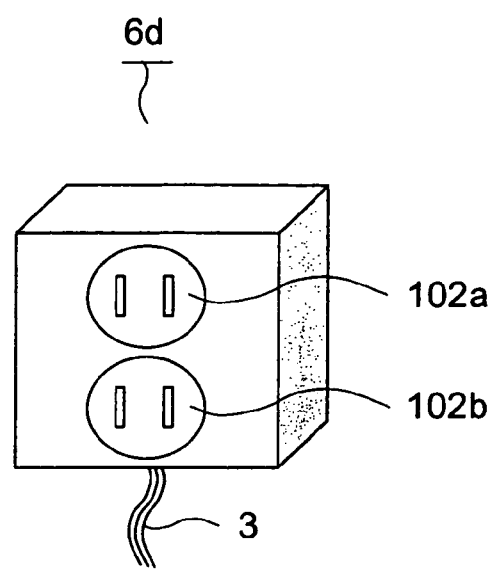
FIG. 2D is a view illustrating still another modified example of an AC adaptor.

In the AC adaptor 6d shown in FIG. 2D, two outlets 102a and 102b are provided in a housing. Since the outlets are provided in the housing, the total number of outlets is not reduced even if a power supplying apparatus uses an outlet (for example, an outlet provided on a wall).

Figure 2E:
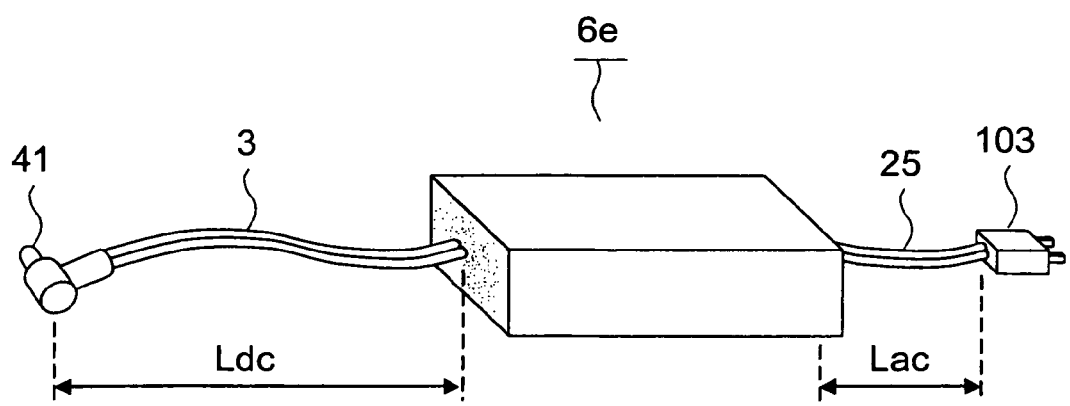
FIG. 2E is a view illustrating still another modified example of an AC adaptor.

In the AC adaptor 6e shown in FIG. 2E, a DC cable 3 and an AC cable 25 are provided on a housing. As shown in FIG. 2E, assuming that the overall length of the DC cable 3 is 'Ldc' and the overall length of the AC cable 25 is 'Lac', Ldc>Lac. That is, the AC cable 25 is shorter than the DC cable 3, and accordingly, even when a cable is long, radiation occurring in the entire cable can be suppressed by concentrating places where the radiation occurs on the side of the DC cable 3.

Figure 3:
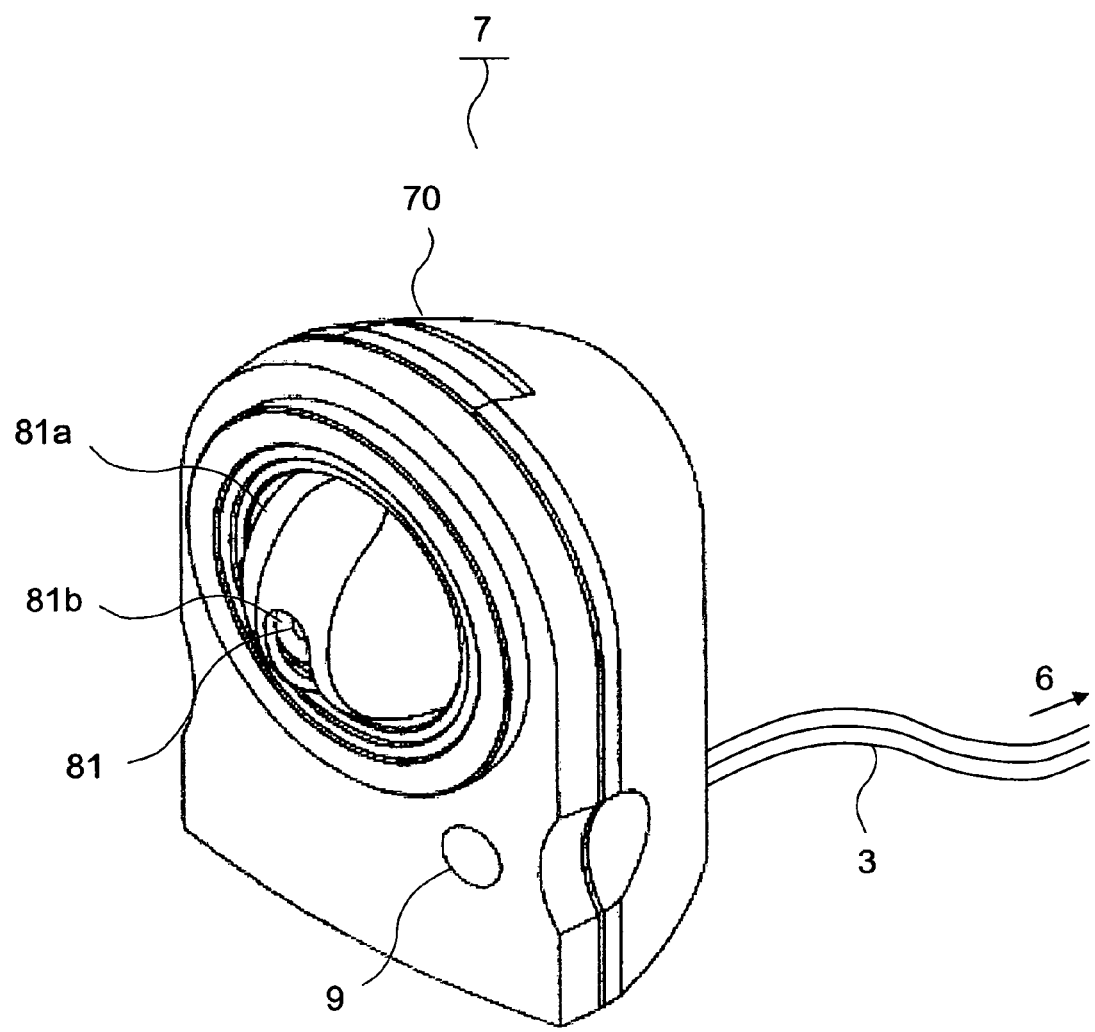
FIG. 3 is a perspective view illustrating a network camera.

In a network camera shown in FIG. 3, a turning part 81a that is rotatable in the horizontal direction is provided in the housing. The turning part 81a is provided with an inclined part 81b that is rotatable in the vertical direction. In addition, the inclined part 81b is provided with the lens 81. Thus, since the lens 81 rotates along the turning part 81a, the lens is rotatable in the horizontal direction. In addition, since the lens 81 rotates along the inclined part 81b, the lens 81 is also rotatable in the vertical direction.

Figure 4:
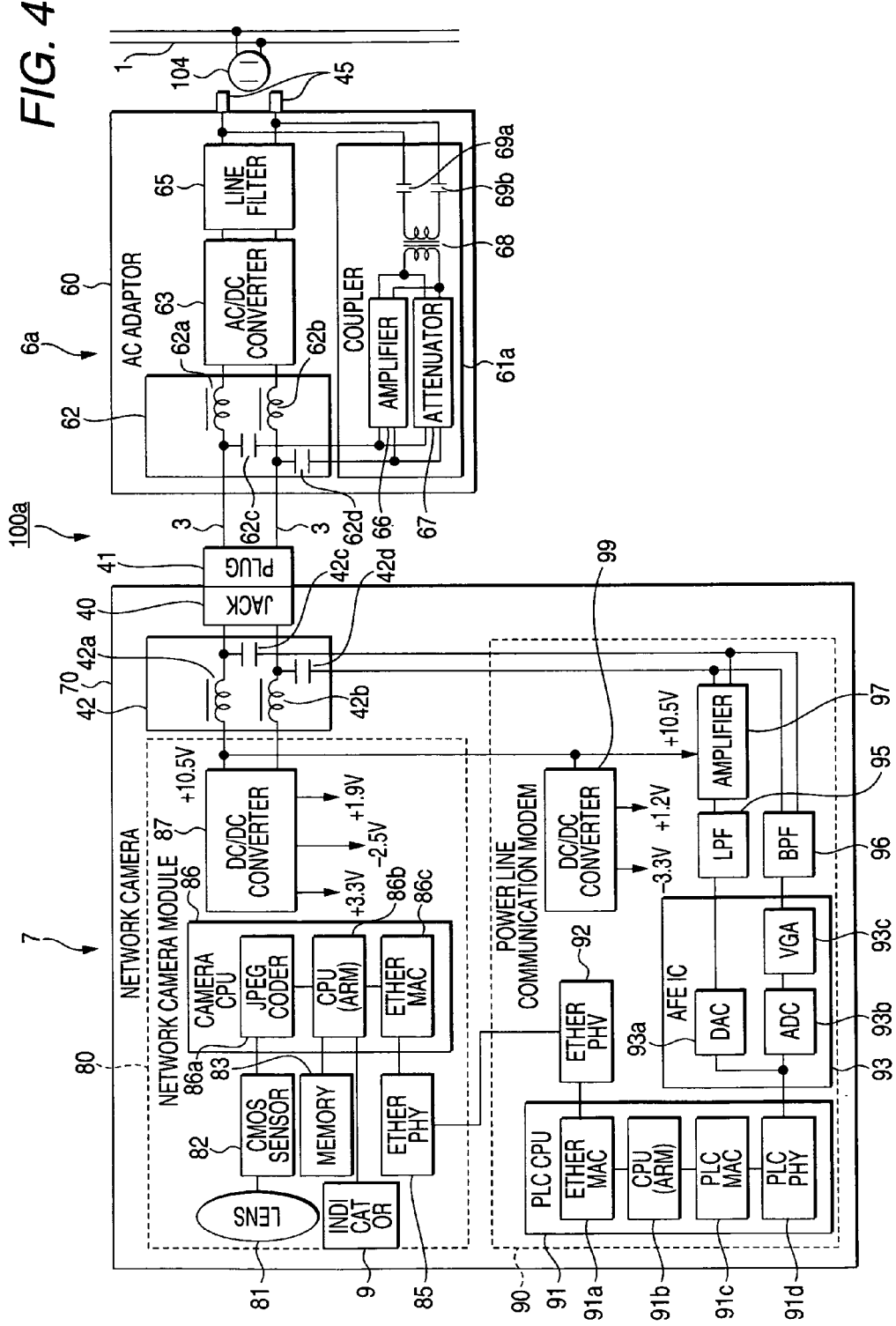
FIG. 4 is a block diagram illustrating hardware of a network camera and an AC adaptor to which the power line communication system according to the first embodiment is applied.

The AC adaptor 6 has a circuit module including various circuits shown in FIG. 4. Specifically, the circuit module includes a line filter 65, an AC/DC converter 63, a signal superimposition and separation circuit 62, and a coupler 61a. The line filter 65 generates a DC voltage from a commercial AC voltage. The AC/DC converter 63 converts an AC voltage to a DC voltage. The signal superimposition and separation circuit 62 superimposes the DC voltage generated by the AC/DC converter 63 and a signal received through a power line and separates a signal transmitted from the network camera 7 from the DC voltage.

The coupler 61a includes an amplifier 66, an attenuator 67, a coupling transformer 68, and coupling capacitors 69a and 69b. The amplifier 66 amplifies a level of a signal transmitted from a power line communication modem before superimposing the signal on a commercial AC voltage. The level may be any one of voltage, power, and current. The attenuator 67 attenuates a received signal from the commercial AC voltage.

In addition, even though the signal superimposition and separation circuit 62 is configured to include choke coils 62a and 62b and capacitors 62c and 62d in FIG. 4, the choke coils 62a and 62b may be short-circuited to each other. Moreover, the circuit module may not be necessarily configured to include only the circuits described above.

The AC adaptor 6a and the network camera 7 are connected to each other through a pair of (two) DC cables 3. Even though the network camera 7 uses the pair of cables because a DC voltage supplied through the DC cable 3 is one kind of voltage, the number may be changed according to the number of outputs. The network camera 7 includes a network camera module 80, a power line communication modem 90, and a signal superimposition and separation circuit 42. The signal superimposition and separation circuit 42 has the same configuration as the signal superimposition and separation circuit 62 of the AC adaptor 6a. A LAN transmission and receiving part of an ETHER/PHY IC 85 of the network camera module 80 is connected to a LAN transmission and receiving part of an ETHER/PHY IC 92 of the power line communication modem 90.

The power line communication modem 90 (indicated by a dotted-line frame) includes a PLC CPU 91, an AFE IC 93, an ETHER (Ethernet®) PHY IC 92, an LPF (low pass filter) 95, a BPF (band pass filter) 96, an amplifier 97, and a DC/DC converter 99. The PLC CPU 91 includes an ETHER MAC block, a CPU 91b, a PLC MAC block 91c, and a PLC PHY block 91d. The AFE IC 93 includes a DAC (analog/digital converter) 93a, an ADC (digital/analog converter) 93b, and a VGA (variable gain amplifier) 93c.

The network camera module 80 (indicated by a dotted-line frame) includes a lens 81, a C-MOS (complementary metal oxide semiconductor) sensor 82, a memory 83, an ETHER PHY IC 85, a camera CPU 86, and a DC/DC converter 87. The camera CPU 86 includes a JPEG coder 86a, CPU 86b, and an ETHER MAC block 86c.

Hereinafter, it will be described about an operation of an AC adaptor integrated power line communication system in the first embodiment configured as described above.

An image signal from the network camera module 80 is transmitted to the power line communication modem 90 through the ETHER PHY IC 85. In the power line communication modem 90, the Ethernet signal transmitted from the ETHER PHY IC 85 to the ETHER PHY IC 92 is converted into a transmission signal by means of the PLC CPU 91 and the AFE IC 93 and then the converted signal is amplified to have a predetermined voltage or power or converted to have low impedance by the amplifier 97 to be then transmitted to the signal superimposition and separation circuit 42. The transmission signal transmitted to the signal superimposition and separation circuit 42 is superimposed on a DC voltage, is separated from the DC voltage in the signal superimposition and separation circuit 62 of the AC adaptor 6a reaching through the DC cable 3, and is then output to the coupler 61a. The transmission signal input to the coupler 61a is amplified up to power required for power line communication by means of the amplifier 66 and is then transmitted to a power line 1. Here, a method of the amplification is not limited to using the amplifier. For example, an amplification method using an OP amplifier or a transistor or an amplification method using a coupling transformer 22 may be used.

Figure 5A:
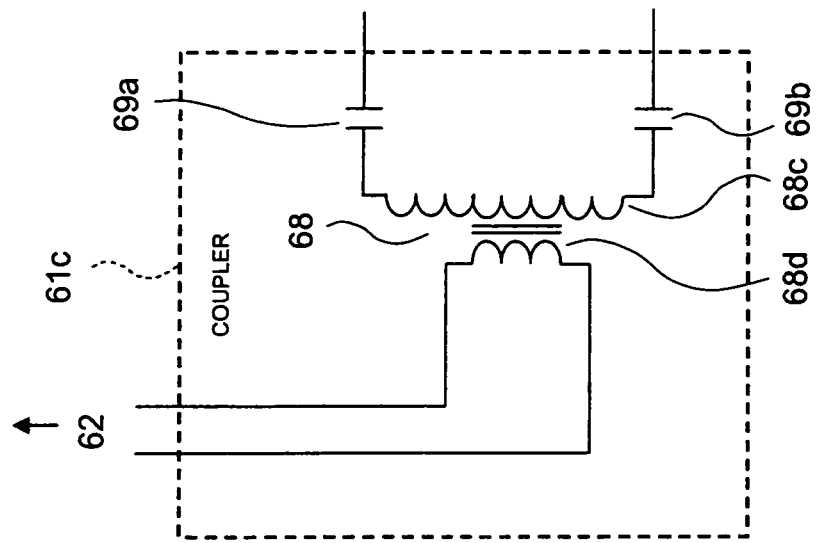
FIG. 5A is a circuit block diagram illustrating a coupler.

The circuit configuration of the coupler 61a will now be described in detail with reference to FIG. 5A. The amplifier 66 has two input terminals and two output terminals, as shown in FIG. 5A. One of the input terminals is connected to an amplifier 66a. The output terminal of the amplifier 66a is connected to a resistor 66c. The resistor 66c is connected to the other output terminal. The other input terminal is connected to an amplifier 66b. The output terminal of the amplifier 66b is connected to a resistor 66d. The resistor 66d is connected to the other output terminal.

The attenuator 67 has two resistors 67a and 67b, as shown in FIG. 5A. The coupling transformer 68 has a secondary coil 68b at the side of the DC cable 3 and a primary coil 68a at the side of the power line 1. The attenuator 67 and the amplifier 66 are connected to the secondary coil 68b.

Figure 5B:
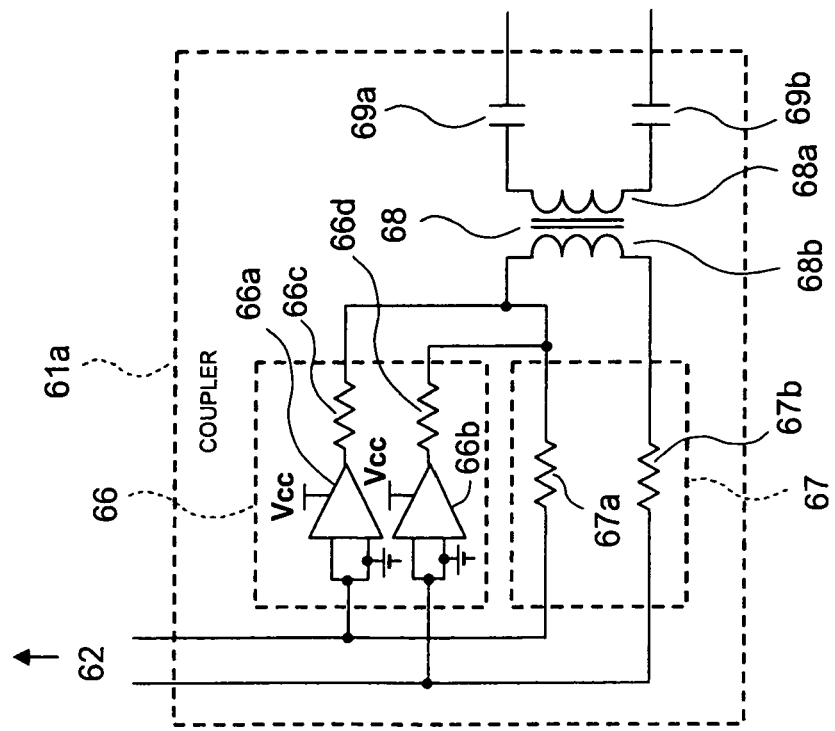
FIG. 5B is a view illustrating a modified example of a coupler.

A coupler 61c shown in FIG. 5B is a modified example of the coupler shown in FIG. 5A. The coupler 61c does not have an amplifier and an attenuator but have only the coupling transformer 68 and the coupling capacitors 69a and 69b. The coupling transformer 68 has a secondary coil 68d at the side of the DC cable 3 and a primary coil 68c at the side of the power line 1. The turn ratio between the primary coil 68c and the secondary coil 68d is N:1, where N is smaller than 1 (for example, N=0.5). That is, the turn ratio of the primary coil with respect to the secondary coil is larger than 1 (in other words, the turn ratio of the secondary coil with respect to the primary coil is smaller than 1). In such a manner described above, the circuit configuration of the coupler 61 can be simply implemented.

Figure 5E:
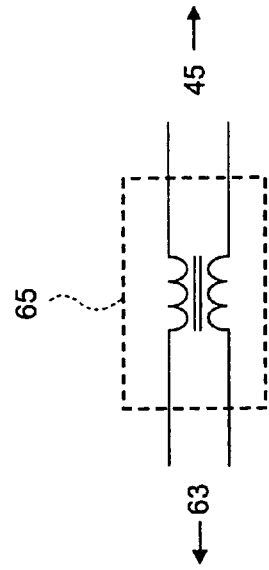
FIG. 5E is a circuit block diagram illustrating a line filter.
Figure 5C:
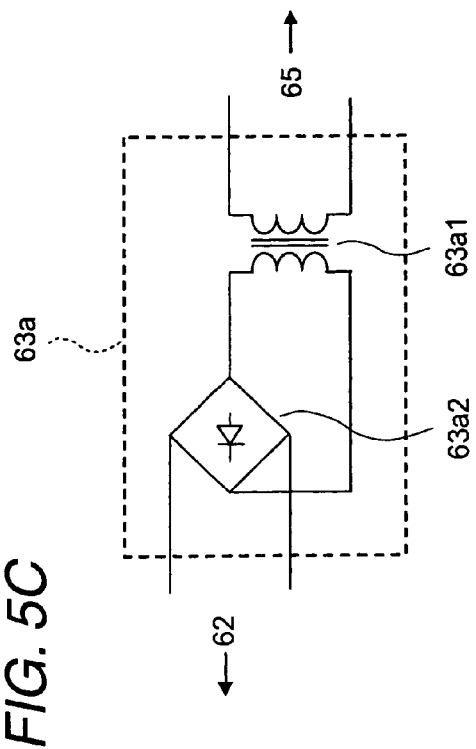
FIG. 5C is a circuit block diagram illustrating an AC/DC converter.
Figure 5D:
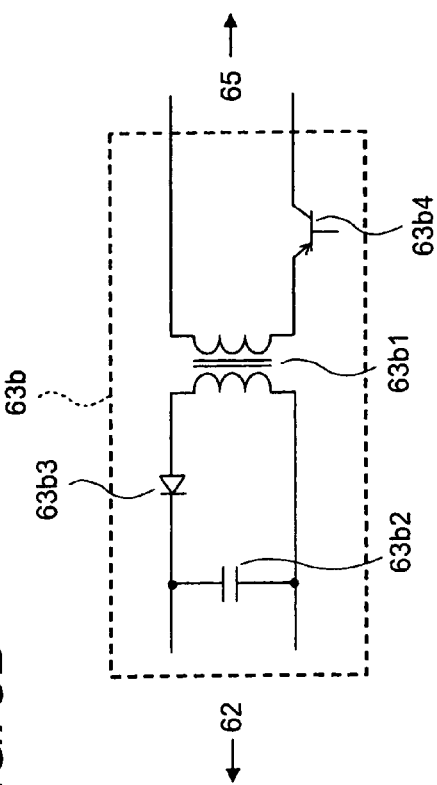
FIG. 5D is a view illustrating a modified example of an AC/DC converter.

An AC/DC converter 63a shown in FIG. 5C has a diode bridge 63a2 and a transformer 63a1. FIG. 5D illustrates a modified example of the AC/DC converter 63. An AC/DC converter 63b shown in FIG. 5D has a transformer 63b1, a capacitor 63b2, a diode 63b3, and a transistor 63b4. The line filter 65 shown in FIG. 5E has two coils magnetically coupled.

Figure 10A:
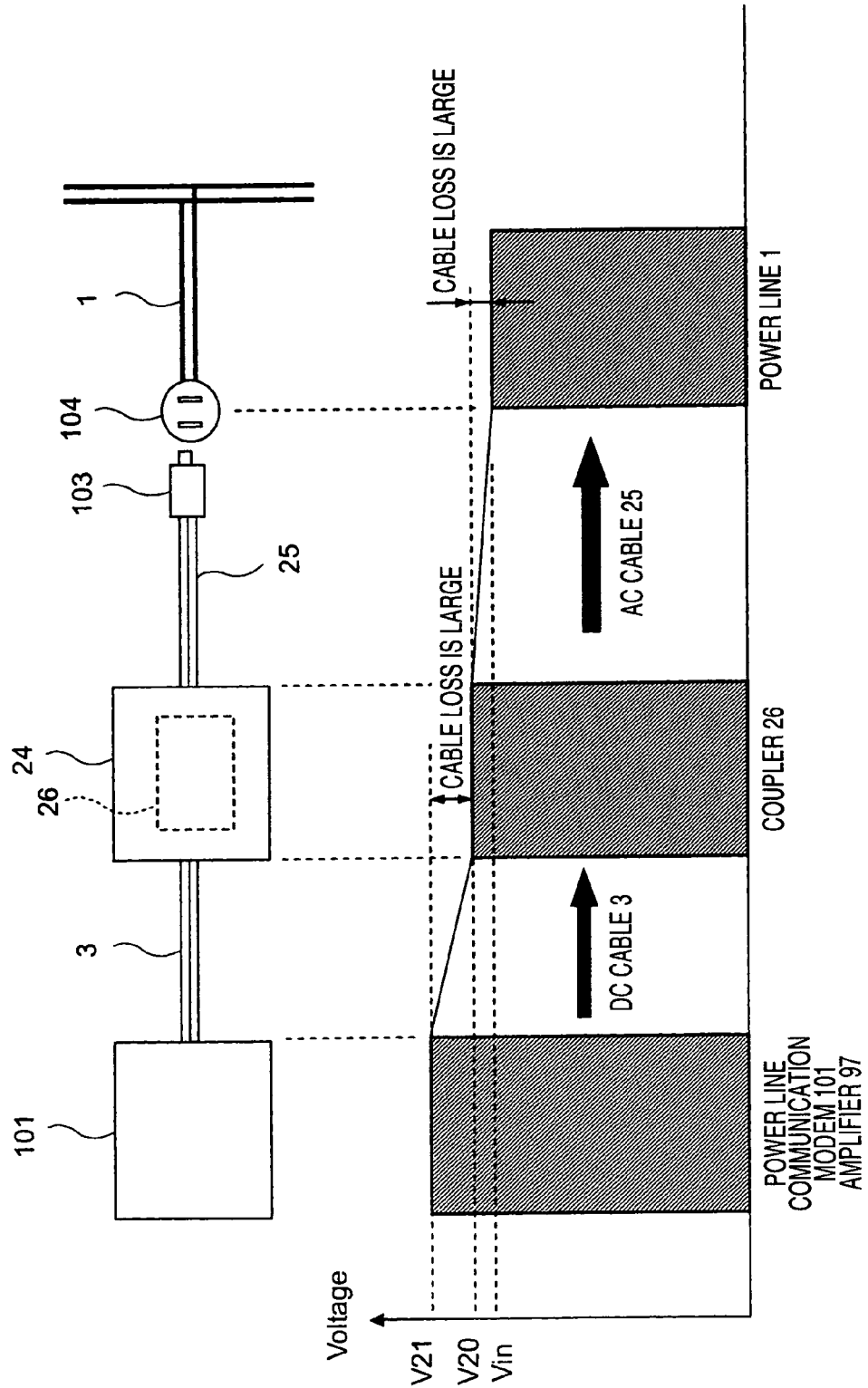
FIG. 10A is an explanatory view illustrating a level of a transmission signal when the related power line communication apparatus performs a transmission operation.

Now, an operation of a power line communication system shown in FIG. 6A will be described while making a comparison with a related power line communication system shown in FIG. 10A. A vertical axis of each graph shown in FIGS. 6A and 10A is a level of a transmission signal and indicates a voltage V. In addition, the level of the transmission level may be power or a current without being limited to a voltage.

In the case of the power line communication, it is necessary to secure predetermined coverage in order to perform reliable communication using a desired network configured by the use of a power line. Here, in order to secure the predetermined coverage, it is assumed that a voltage Vin is needed as a level of a transmission signal at the time of input to an outlet 104.

In a power line communication modem shown 101 in FIG. 10A, since there is a cable loss in the DC cable 3 and the AC cable (commercial power code) 25, a voltage V21 higher than a voltage Vin supplied to the power line 1 is needed as a level of a transmission signal output from the amplifier 97. Accordingly, a cable loss (that is, loss corresponding to a difference (V21−V20)) of the transmission signal passing through the DC cable 3 increases, and as a result, the amount of radiation also increases in correspondence with the increased cable loss. Moreover, even when transmitting the transmission signal from a coupler 26 to the power line 1, a cable loss (that is, loss corresponding to a difference (V20−Vin)) of the AC cable 25 occurs, and accordingly, the amount of radiation also increases.

In contrast, in the power line communication system shown in FIG. 6A, since a level of a transmission signal in the coupler 61 included in the AC adaptor 6 is amplified, it is possible to suppress a level of a transmission signal output from the amplifier 97 included in the network camera 7. That is, while maintaining the level Vin of the transmission signal input to an outlet 104, it is possible to make amplification degree of the amplifier 97 smaller than that of the amplifier 97 shown in FIG. 10A. Alternatively, the amplifier 97 shown in FIG. 6A may be removed. Thus, the level of a transmission signal passing through the DC cable 3 can be suppressed as compared with the case shown in FIG. 10A, it is possible to reduce the cable loss (that is, loss corresponding to a difference (V11−V10)) of the transmission signal passing through the DC cable 3. As a result, an amount of radiation can be reduced as compared with the case shown in FIG. 10A.

Furthermore, by directly providing the plug 45 in the housing of the AC adaptor 6, it is possible to eliminate the cable loss of the transmission signal amplified by the coupler 61. Thus, even when a cable is long, the radiation occurring in the cable can be suppressed while securing coverage of a transmission signal transmitted to the power line 1.

Next, reception of a signal in the power line communication will be described with reference to FIG. 4.

A received signal received through the power line 1 is input to the coupler 61a of the AC adaptor 6a. The coupler 61a attenuates a level of the received signal and then transmits the attenuated signal to the signal superimposition and separation circuit 62. A method of the attenuation includes a voltage drop method using an attenuator (resistor) or the coupling transformer 22. The received signal transmitted to the signal superimposition and separation circuit 62 is superimposed on a DC voltage and is then separated from the DC voltage in the signal superimposition and separation circuit 42 reaching through the DC cable 3. Then, the received signal is converted to an Ethernet signal in the AFE IC 93 and the PLC CPU 91 and is then transmitted from the ETHER PHY IC 92 to the ETHER PHY IC 85 of the network camera module 80, thereby performing communication with the network camera module 80.

The above operation will now be described with reference to FIG. 6B, while making a comparison with related power line communication shown in FIG. 10B.

In the power line communication shown in FIG. 10B, a cable loss (that is, loss corresponding to a difference (V40−V41)) of a received signal received through the power line 1 occurs in the AC cable 25, and accordingly, a large amount of radiation occurs. In addition, since the level V41 of the received signal input to the coupler 26 is supplied to the DC cable 3 without being attenuated, the level V41 passing through the DC cable 3 increases. Accordingly, a cable loss (that is, loss corresponding to a difference (V42−V41)) increases, which causes radiation to increase in correspondence with the increased cable loss. Assuming a level of a transmission level required at the side of the power line communication modem is Vout, a voltage of a received signal input to the AFE IC 93 is larger than a voltage required for communication by an excessive input voltage (that is, a difference (V42−Vout)).

In contrast, in the power line communication system shown in FIG. 6B, the received signal received through the power line 1 is directly input to the coupler 61 by the use of the plug 45, a cable loss does not occur. Accordingly, the radiation can be suppressed. Further, since the coupler 61 attenuates the level of the received signal by the use of the attenuator 67 or the coupling transformer 68 such that an excessive voltage supplied to the power line communication modem 90 drops and then transmits the signal to the signal superimposition and separation circuit 42, it is possible to reduce the cable loss (that is, loss corresponding to a difference (V32−V31)) of the DC cable 3. As a result, even when a cable is long, unnecessary radiation noises can be suppressed.

Second Embodiment

Figure 7:
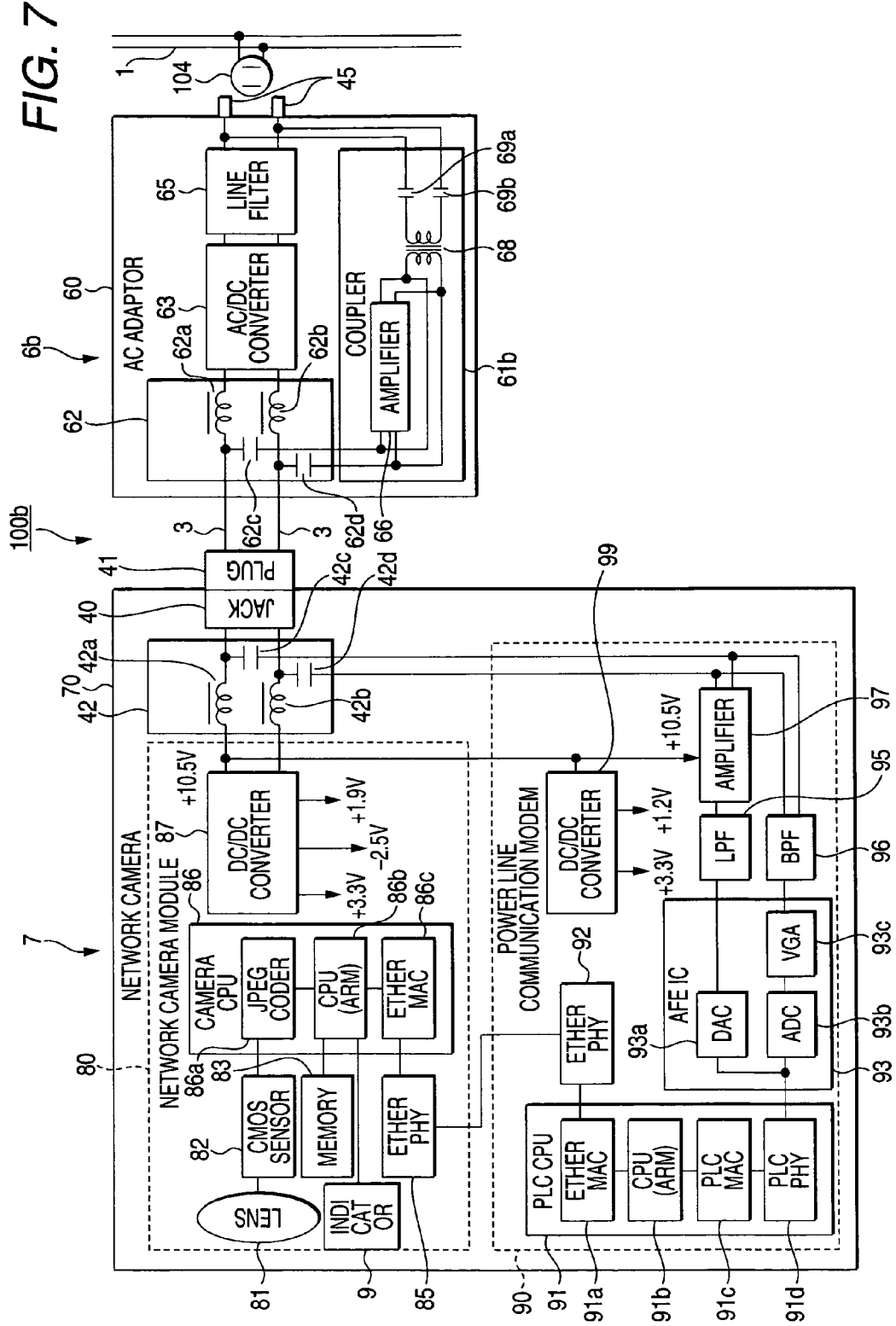
FIG. 7 is a block diagram illustrating hardware of a network camera and an AC adaptor to which a power line communication system according to a second embodiment is applied.

FIG. 7 is a block diagram illustrating hardware of a network camera and an AC adaptor to which a power line communication system according to a second embodiment is applied.

Referring to FIG. 7, the second embodiment is different from the first embodiment in that the attenuator 18 of the coupler 3 is removed.

Hereinafter, it will be described about an operation of an AC adaptor integrated power line communication system in the second embodiment configured as described above.

Transmission from the power line communication modem 90 to the power line 1 is the same as the operation described in the first embodiment and FIG. 6B. In the case when the power line communication modem 90 receives a signal from the power line 1, the power line communication is performed without attenuating the level of the received signal. Thus, it is possible to reduce a cable loss occurring at the time of transmission from the coupler 61 to the power line 1 and a cable loss at the time of transmission from the power line communication modem 90 to the AC adaptor 6. As a result, even when a cable is long, unnecessary radiation noises can be suppressed.

Third Embodiment

Figure 8:
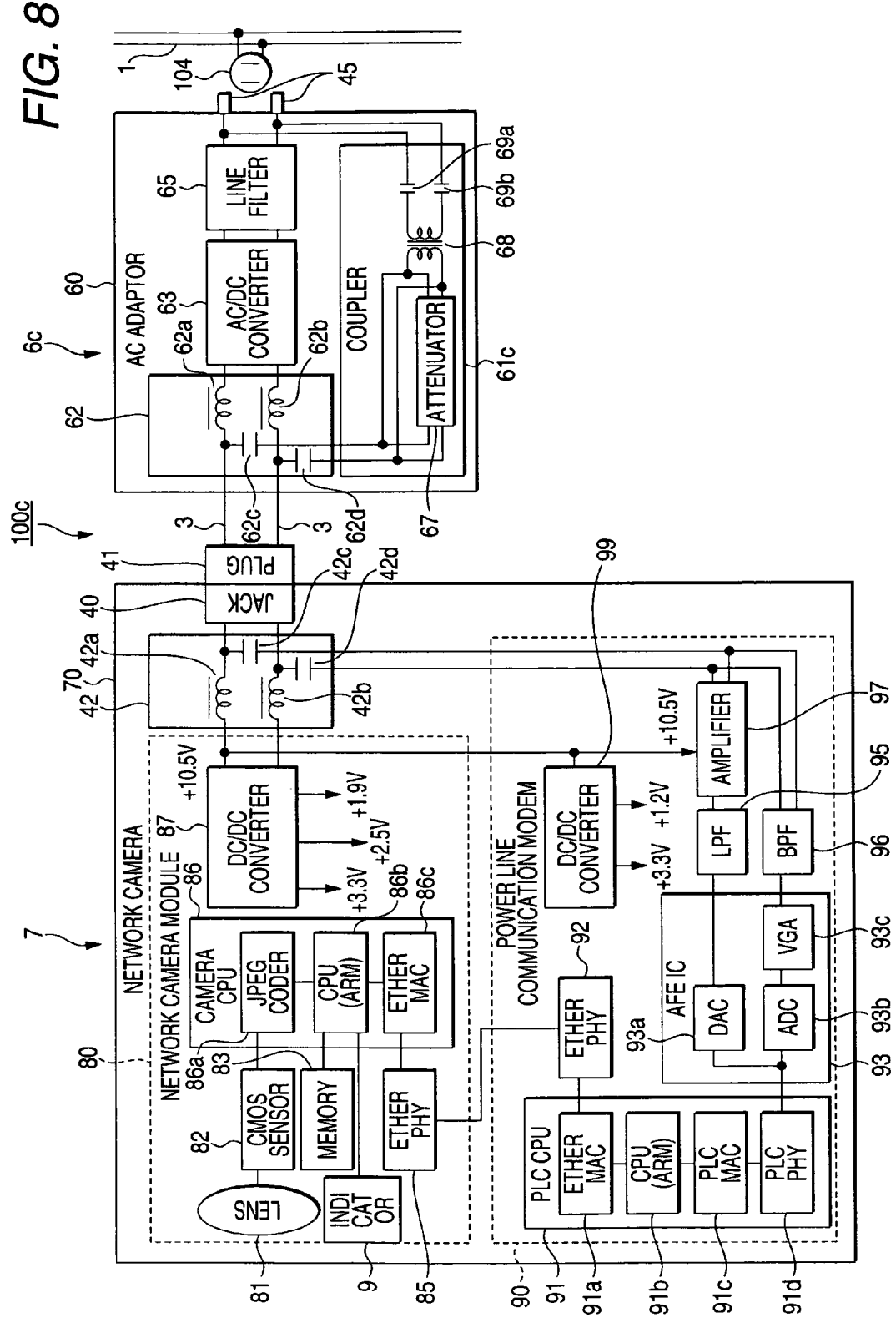
FIG. 8 is a block diagram illustrating hardware of a network camera and an AC adaptor to which a power line communication system according to a third embodiment is applied.
Figure 9:
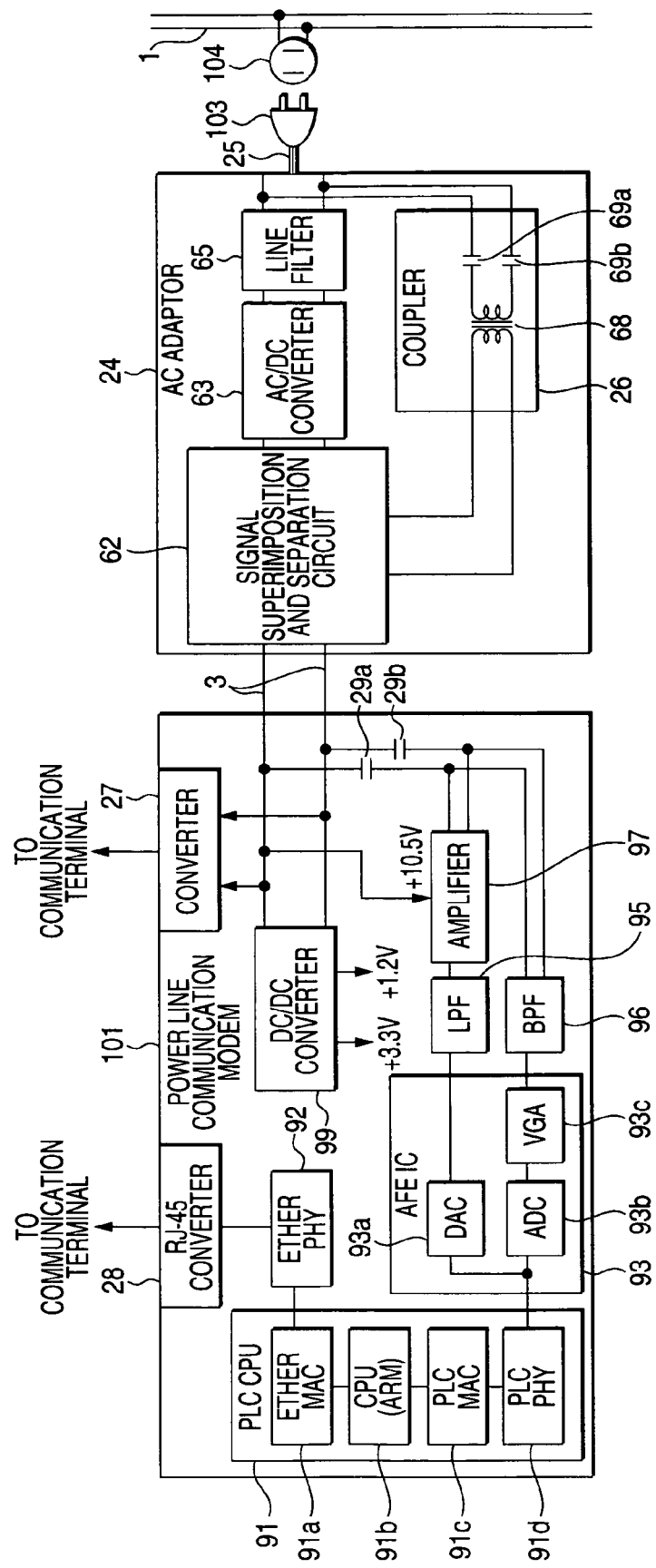
FIG. 9 is a block diagram illustrating hardware of a related power line communication apparatus.

FIG. 8 is a block diagram illustrating hardware of a network camera and an AC adaptor to which a power line communication system according to a third embodiment is applied.

Referring to FIG. 8, the third embodiment is different from the first embodiment in that the amplifier 97 of the coupler 61 is removed.

Hereinafter, it will be described about an operation of an AC adaptor integrated power line communication system in the third embodiment configured as described above.

An operation in which the power line communication modem 90 receives a signal from the power line 1 is the same as the operation described in the first embodiment and FIG. 6B. Transmission from the power line communication modem 90 to the power line 1 is realized by transmitting a communication signal, which is required for the power line 1, by the use of the amplifier 97 of the power line communication modem 90 without amplification using the AC adaptor 6.

As described above, in the power line communication system according to the third embodiment, it is possible to reduce a cable loss occurring at the time of transmission from the coupler 61 to the power line 1 and a cable loss at the time when the power line communication modem 90 receives the signal from the AC adaptor 6. As a result, even when a cable is long, unnecessary radiation noises can be suppressed.

In the above first to third embodiments, it has been described about the network camera to which the power line communication system is applied. However, the invention is not limited to the imaging device. For example, the invention may be applied to an image display device that displays an image. Even in the case of transmitting or receiving an image under a state in which a display or an image display device, such as a television, is disposed at a place distant from a power outlet, the same effects as described above can be obtained.

Fourth Embodiment

Hereinafter, embodiments of the invention will be described with reference to the accompanying drawings.

Figure 11:
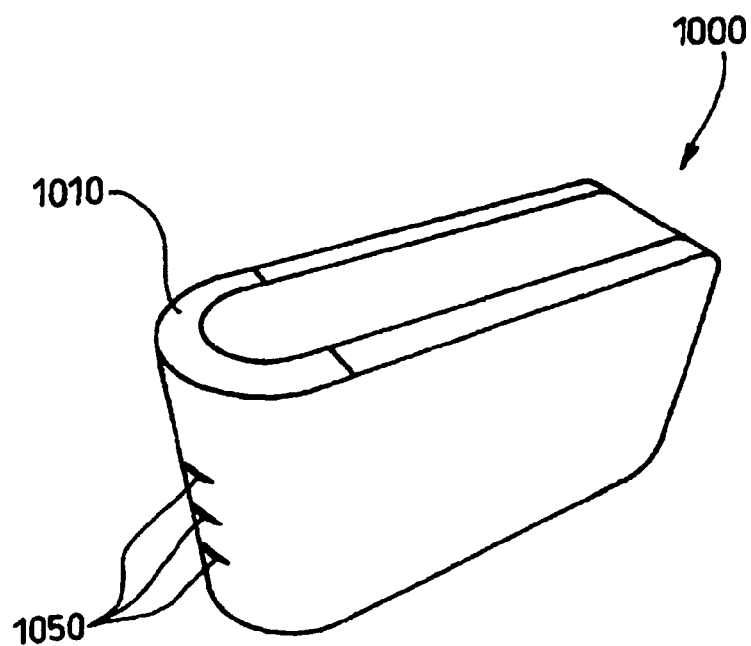
FIG. 11 is a perspective view illustrating a front surface of a PLC modem which is one of the power line communication apparatuses according to embodiments of the invention.
Figure 12:
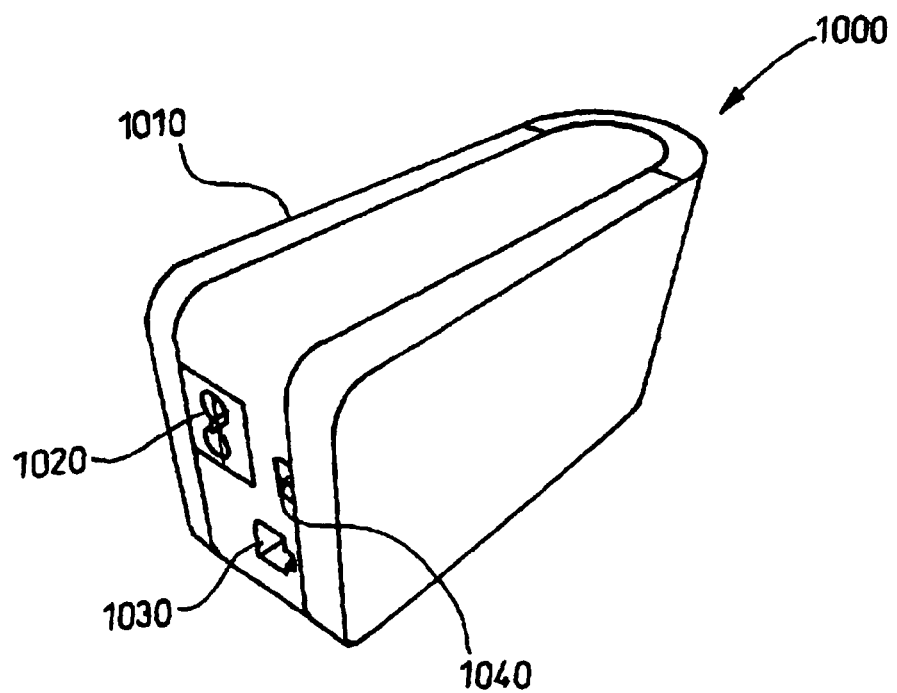
FIG. 12 is a perspective view illustrating a rear surface of the PLC modem which is one of the power line communication apparatuses according to the embodiments of the invention.
Figure 13:
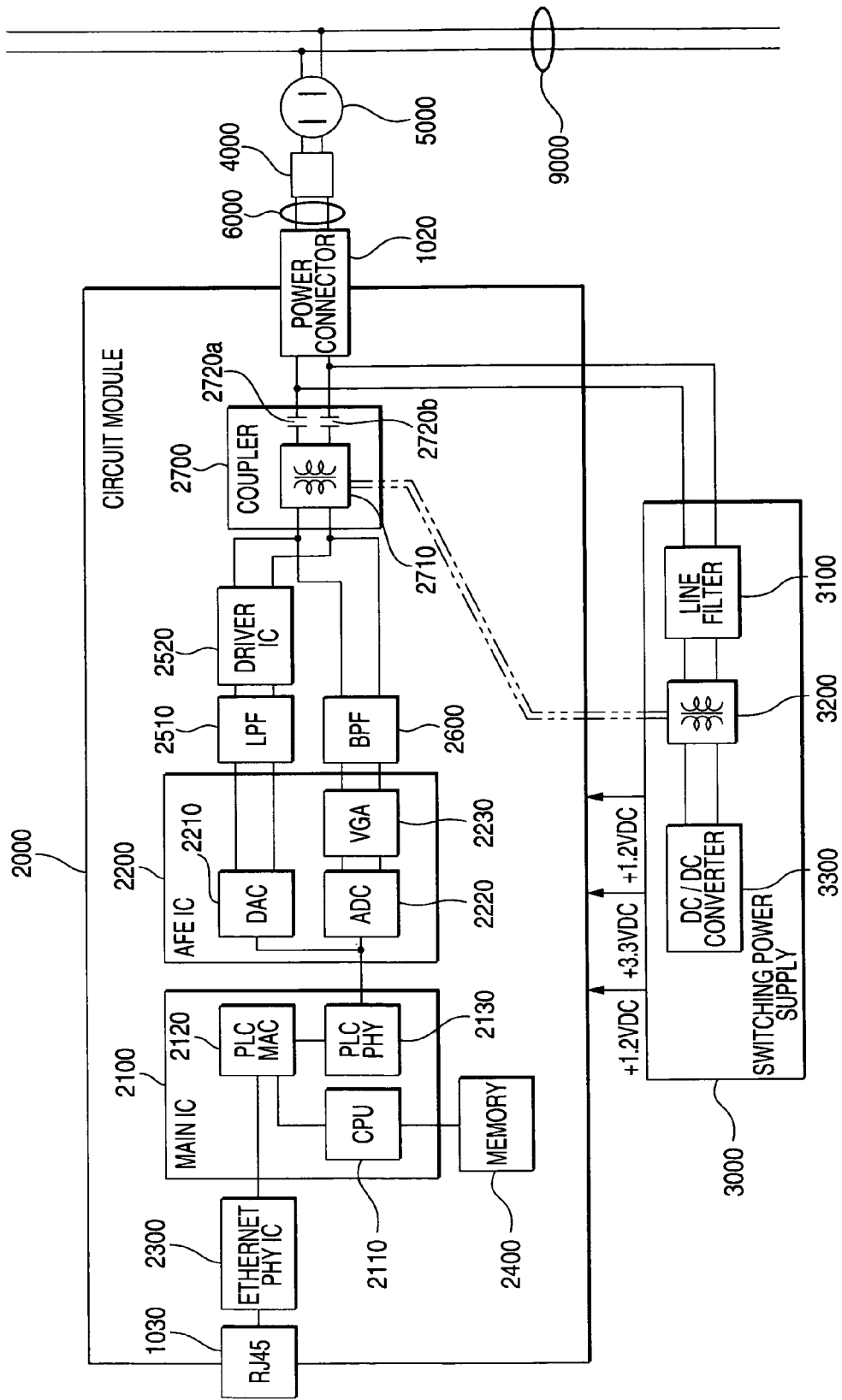
FIG. 13 is a block diagram illustrating an example of hardware of the PLC modem which is one of the power line communication apparatuses according to the embodiments of the invention.

FIG. 13 is a block diagram illustrating an example of hardware included in one of the power line communication modems shown in FIGS. 4, 7, and 8. In the following description, a power line communication modem is referred to as a 'PLC modem'. The PLC modem includes a circuit module 2000 and a switching power supply 3000. In FIG. 13, a power supplying apparatus is omitted. That is, the power supplying apparatus may not be necessarily provided. In this case, a power line communication apparatus may be configured as shown in FIGS. 11 and 12. A PLC modem 1000 shown in FIGS. 11 and 12 includes a housing 1010. On a front surface of the housing 1010, a display part 1050 such as an LED (light emitting diode) is provided as shown in FIG. 11. In addition, on a rear surface of the housing 1010, a power connector 1020, a modular jack 1030 for LAN (local area network) such as an RJ45, and a switching switch 1040 for switching an operation mode are provided as shown in FIG. 12. The power connector 1020 is connected with a power cable (not shown), and the modular jack 1030 is connected with a LAN cable (not shown). In addition, the power line communication modem 1000 may further include a Dsub (D-subminiature) connector such that a Dsub cable is connected to the Dsub connector.

The switching power supply 3000 serves to supply a variety of voltages (for example, +1.2 V, +3.3 V, or +12 V) to the circuit module 2000 and is configured to include, for example, a line filter 3100, a switching transformer 3200, and a DC/DC converter 3300. The line filter 3100 serves to filter off noises from the outside and to prevent noises inside an electronic apparatus from being output to the outside. The switching transformer 3200 serves to hold an output voltage or an output current at a predetermined level even if a large rush current or the like is generated at the time of supply of input power, and the switching transformer 3200 is physically integrated with a coupling transformer 2710 of the circuit module 2000 to be described below. In addition, the DC/DC converter 3300 serves to convert a DC voltage from the switching transformer 3200 to various DC voltages.

The circuit module 2000 includes a main IC (integrated circuit) 2100, an AFE•IC (analog front end IC) 2200, Ethernet PHY•IC (physical layer integrated circuit) 2300, a memory 2400, a low pass filter (LPF) 2510, a driver IC 2520, a band pass filter (BPF) 2600, and a coupler 2700. The switching power supply 3000 and the coupler 2700 are connected to the power connector 1020. Moreover, the switching power supply 3000 and the coupler 2700 are connected to a power line 9000 through a power cable 6000, a power plug 4000, an outlet 5000. In addition, the main IC 2100 functions as a control circuit that performs power line communication.

The main IC 2100 includes a CPU (central processing unit) 2110, a PLC•MAC (power line communication media access control layer) block 2120, and a PLC•PHY (power line communication physical layer) block 2130. The CPU 2110 is mounted with a 32-bit RISC (reduced instruction set computer) processor. The PLC•MAC block 2120 manages an MAC layer (media access control layer) of a transmission signal, and the PLC•PHY block 2130 manages a PHY layer (physical layer) of the transmission signal. The AFE•IC 2200 is configured to include a D/A converter (DAC) 2210, an A/D converter (ADC) 2220, and a variable gain amplifier (VGA) 2230. The coupler 2700 includes a coupling transformer 2710 integrated with the switching transformer 3200 and coupling capacitors 2720a and 2720b. As described above, the coupling transformer 2710 is physically integrated with the switching transformer 3200. Further, the CPU 2110 controls operations of the PLC MAC block 2120 and the PLC•PHY block 2130 and the entire power line communication modem 1000 by using data stored in the memory 2400.

The power line communication modem 1000 performs a multi-carrier communication using a plurality of sub-carriers on the basis of an OFDM (orthogonal frequency division multiplexing) method. Digital signal processing for the transmission is performed by the main IC 2100, specifically, the PLC•PHY block 2130. Since a variety of digital signal processing performed by the main IC 2100 has been proposed, a detailed explanation thereof will be omitted.

The communication using the power line communication modem 1000 is performed as follows. Data input from the modular jack 1030 is transmitted to the main IC 2100 through the Ethernet PHY•IC 2300, and then main IC 2100 performs the digital signal processing to generate a digital transmission signal. The generated digital transmission signal is converted to an analog signal by means of the D/A converter (DAC) 2210 of the AFE•IC 2200 and is then output to the power line 9000 through the low pass filter 2510, the driver IC 2520, the coupler 2700, the power connector 1020, the power cable 6000, the power plug 4000, and the outlet 5000.

The signal transmitted to the power line 9000 is transmitted to the band pass filter 2600 through the coupler 2700, and then a gain of the signal transmitted to the band pass filter 2600 is adjusted by the variable gain amplifier (VGA) 2230 of the AFE•IC 2200 and is then converted to a digital signal in the A/D converter (ADC) 2220. Then, the converter digital signal is transmitted to the main IC 2100 and is then converted to digital data by means of digital signal processing. The converted digital data is output from the modular jack 1030 through the Ethernet PHY•IC 2300.

Next, a transformer unit obtained by physically integrating the switching transformer 3200 with the coupling transformer 2710 in an embodiment of the invention will be described with reference to the accompanying drawings.

Figure 14:
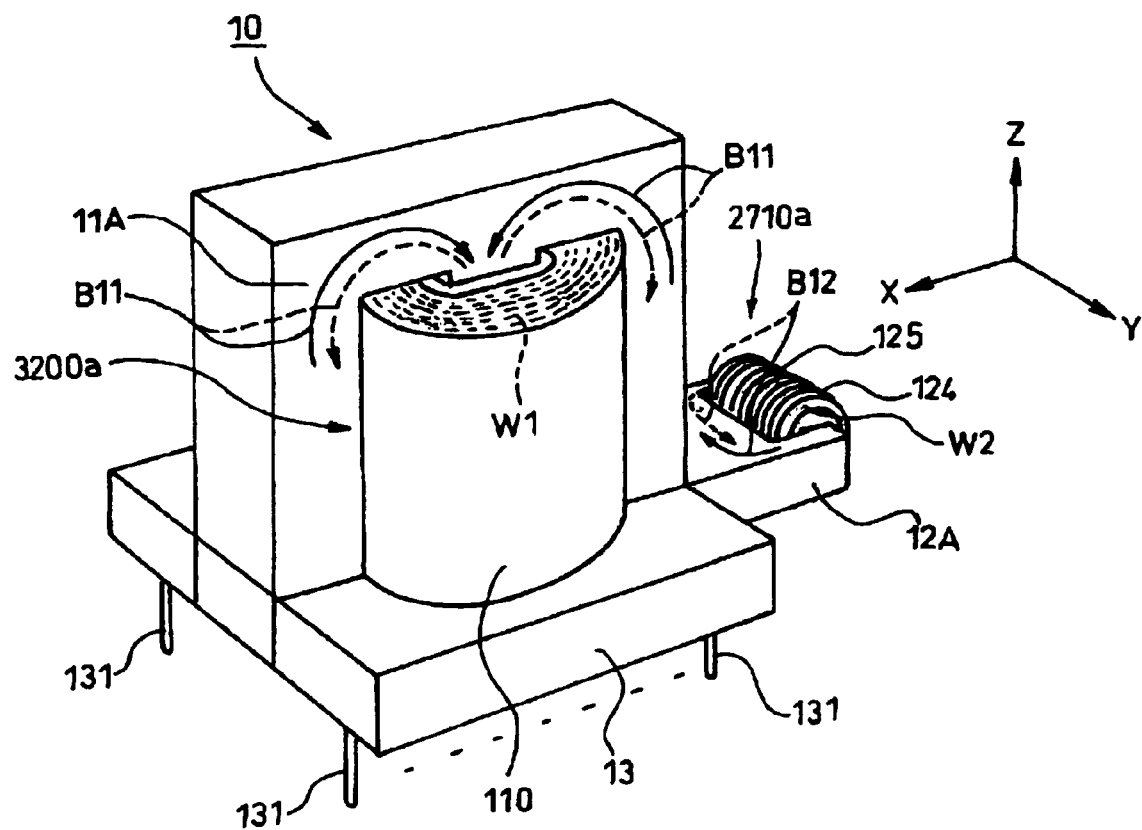
FIG. 14 is a perspective view illustrating a transformer unit according to a first embodiment of the invention.
Figure 15:
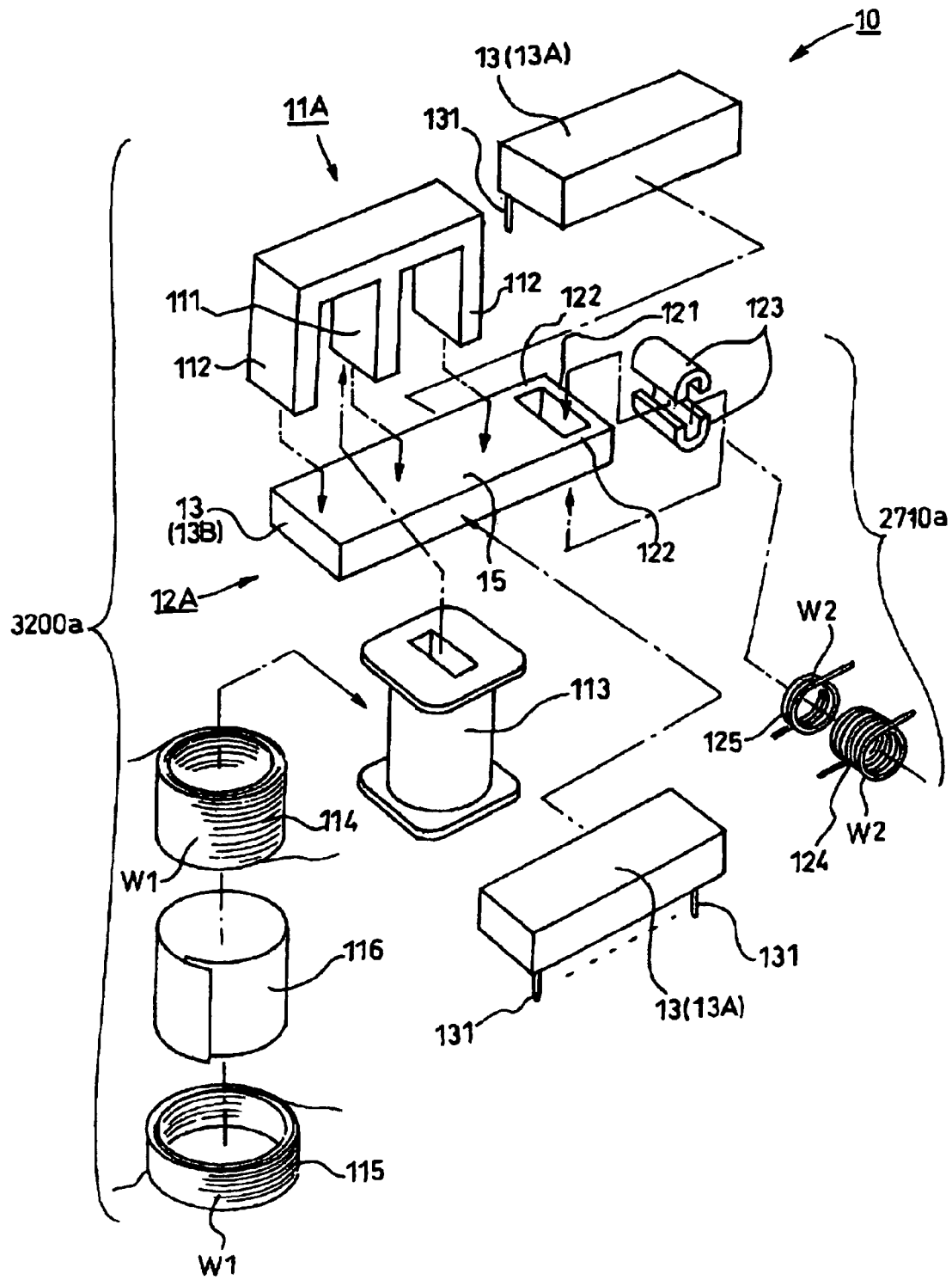
FIG. 15 is an exploded perspective view illustrating the transformer unit according to the first embodiment of the invention.

FIGS. 14 and 15 are perspective view and exploded perspective view illustrating a transformer unit 10 according to the fourth embodiment of the invention, respectively. The transformer unit 10 is realized by integrating a switching transformer (large transformer) for a TV, a PC, an electronic appliance, or a power line communication apparatus with another small transformer. In addition, the transformer unit 10 may be used as the switching transformer 3200 and the coupling transformer 2710 of the PLC modem shown in FIG. 13.

The transformer unit 10 shown in FIGS. 14 and 15 is a vertical transformer unit that transforms an AC voltage of a power line. A switching transformer 3200a serving as a first transformer and a coupling transformer 2710a serving as a second transformer use a pedestal 13 in common. Further, in FIG. 14, reference numeral B 11 indicates a magnetic path in the switching transformer 3200a and reference numeral B12 indicates a magnetic path in the coupling transformer 2710a. Furthermore, the magnetic path B12 in the coupling transformer 2710a is created over the entire pedestal 13 positioned below an E-shaped core 11A as well as a portion shown in FIG. 14.

As shown in FIG. 15, the switching transistor 3200a is configured to include the E-shaped core 11A, the pedestal 13, a bobbin 113, primary coil 114 and secondary coil 115 formed of an electric wire W1, such as copper wires, wound on the bobbin 113, and an insulating sheet 116 provided between the primary coil 114 and the secondary coil 115. The E-shaped core 11A is formed of a ferromagnetic material such as ferrite. The E-shaped core 11A and the pedestal 13 are fixed to each other by the use of a suitable material so as to be integrated with each other.

The E-shaped core 11A has a first leg part 111, which forms a first core on which the primary coil 114 and the secondary coil 115 are wound with the bobbin 113 interposed therebetween, and second leg parts 112, which form a first yoke used to create a closed magnetic path B11 together with the first leg part 111. The first leg part 111 is inserted into the bobbin 113 having the primary coil 114 wound on an inner layer thereof and the secondary coil 115 wound on an outer layer thereof and is then disposed on the pedestal 13 that forms the first yoke. Thus, the E-shaped core 11A and the pedestal 13 create the closed magnetic path B11. In addition, when the primary coil 114 is connected to a side of a commercial power supply voltage, a current flows through the secondary coil 115 due to electromagnetic induction between the primary coil 114 and the secondary coil 115, and as a result, a voltage corresponding to the number of turns of wires is generated. The closed magnetic path B11 of the switching transformer 3200a having the configuration described above is created mostly within the E-shaped core 11A and the pedestal 13. In addition, the secondary coil 115 is covered with a sheet-shaped insulating material 110 (refer to FIG. 14) for safety.

The coupling transformer 2710a is configured to include the pedestal 13 (13B), a bobbin 123, and primary coil 124 and secondary coil 125 formed of an electric wire W2 coated for insulation, such as a vinyl-coated electric wire. The bobbin 123 is disposed around a ring-shaped portion formed at an end portion of the pedestal 13B, and the primary coil 124 and the secondary coil 125 are wound on the disposed bobbin 123. In addition, the primary coil 124 and the secondary coil 125 may be electrically insulated from each other by the use of an insulating sheet, for example. An end portion of the pedestal 13 forms a second core 121 on which the primary coil 124 and the secondary coil 125 are wound with the bobbin 123 interposed therebetween, and the other end portion of the pedestal 13 forms a second yoke 122 used to create a closed magnetic path together with the second core 121. The primary coil 124 and the secondary coil 125 are wound on the second core 121 so as to be parallel to each other in the horizontal direction. The primary coil 124 is connected to the side of a commercial power supply voltage (for example, the power connector 1020 shown in FIG. 13) through the coupling capacitors 2720a and 2720b, and the secondary coil 125 is connected to a side of a communication apparatus (for example, the main IC 2100 or the AFE•IC 2200 shown in FIG. 1). Moreover, the electric wires W2 that form the primary coil 124 and the secondary coil 125 may be formed by directly winding coils on the second core 121 without using the bobbin 123. In addition, when the width of the pedestal 13B is so small that the electric wires W2 cannot be wound on the second core 12, the second yoke 122 may be formed to expand in both directions (±Y directions in FIG. 14). The closed magnetic path B12 of the coupling transformer 2710a having the configuration described above is created mostly within the pedestal 13.

As is apparent from FIG. 14, in the transformer unit according to the present embodiment, the closed magnetic path B11 created by the switching transformer 3200a exists on a plane parallel to an X-Z plane, and the closed magnetic path B12 created by the coupling transformer 2710a exists on a plane parallel to an X-Y plane. Therefore, the plane (plane parallel to the X-Z plane) surrounded by the closed magnetic path B11 is perpendicular to the plane (plane parallel to the X-Y plane) surrounded by the closed magnetic path B12. That is, magnetic fields of the two transformers are created on the planes perpendicular to each other. Accordingly, since both the planes are not parallel to each other, interference between the magnetic fields of the two transformers can be suppressed. In addition, even if the magnetic fields of the two transformers are not precisely perpendicular to each other, it is possible to suppress the interference between the magnetic fields by causing the magnetic fields not to be parallel to each other. In addition, the pedestal 13 forms both a part of the first yoke 112 and a part of the second yoke 122, and a common part 15 (part positioned below the E-shaped core 11A) is a part where the closed magnetic path B11 and the closed magnetic path B12 are created. As described above, the entire transformer unit 10 can be made small.

The pedestal 13 is configured by integrating the second pedestal 13B, which forms the closed magnetic path B11 of the switching transformer 3200a and the closed magnetic path B12 of the coupling transformer 2710a, with first and third pedestals 13A and 13C positioned at both sides of the pedestal 13B. The pedestal 13 is fixed on a substrate or a chassis (not shown) for the purpose of electrical connection with other electronic components mounted on a substrate (not shown). A connection terminal 131 is provided on a bottom surface of each of the pedestals 13A, 13B, and 13C, and the terminal 131 is connected to an electronic circuit on a substrate, for example. The first pedestal 13A and the third pedestal 13C are not essential, so that the first pedestal 13A and the third pedestal 13C may be omitted. Alternatively, a member obtained by forming the first pedestal 13A, the second pedestal 13B, and the third pedestal 13C may be formed such that totally one pedestal is used.

As described above, the vertical transformer unit 10 according to the present embodiment is configured such that the plane (X-Z plane in FIG. 4) to which the closed magnetic path B11 created by the switching transformer 3200a belongs is not parallel to the plane (X-Y plane in FIG. 4) to which the closed magnetic path B12 created by the coupling transformer 2710a belongs. Accordingly, even when the same core that is integrally formed is used, a required efficient transforming operation can be realized without electrical interference between different magnetic fields. In addition, since at least a part of a yoke that creates a magnetic field is formed by the use of a common member, the entire transformer unit 10 can be made small. In addition, since a large transformer is formed in a vertical manner, it is possible to reduce an area where the transformer unit 10 is mounted on a substrate or the like.

Fifth Embodiment

Figure 16:
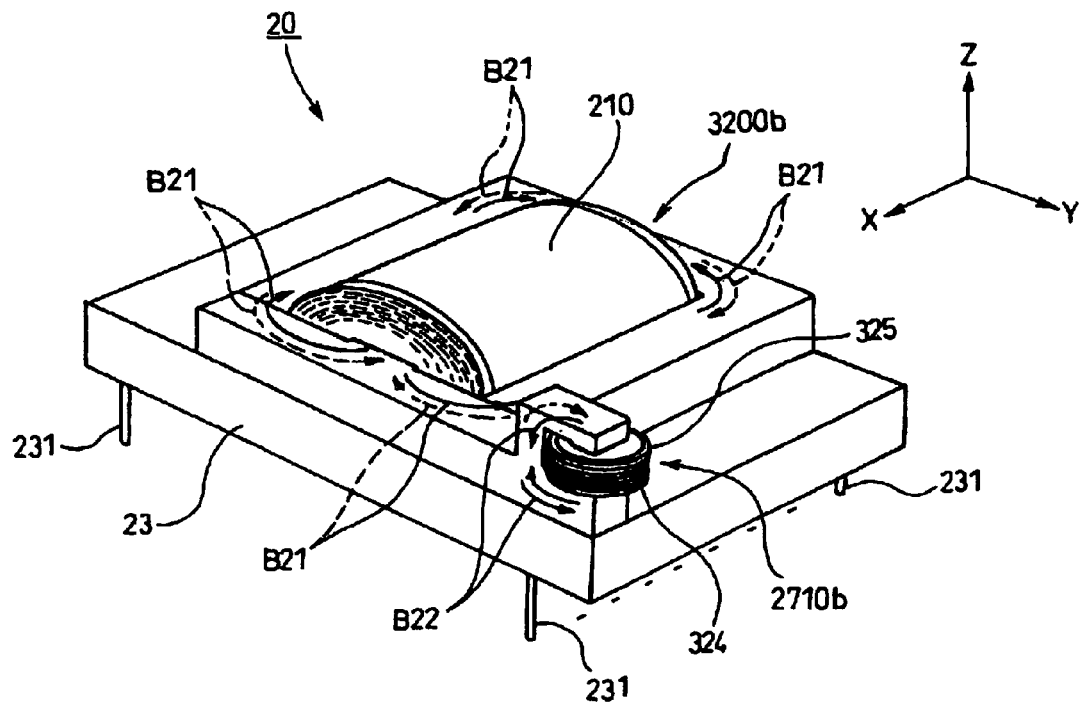
FIG. 16 is a perspective view illustrating a transformer unit according to a second embodiment of the invention.
Figure 17:
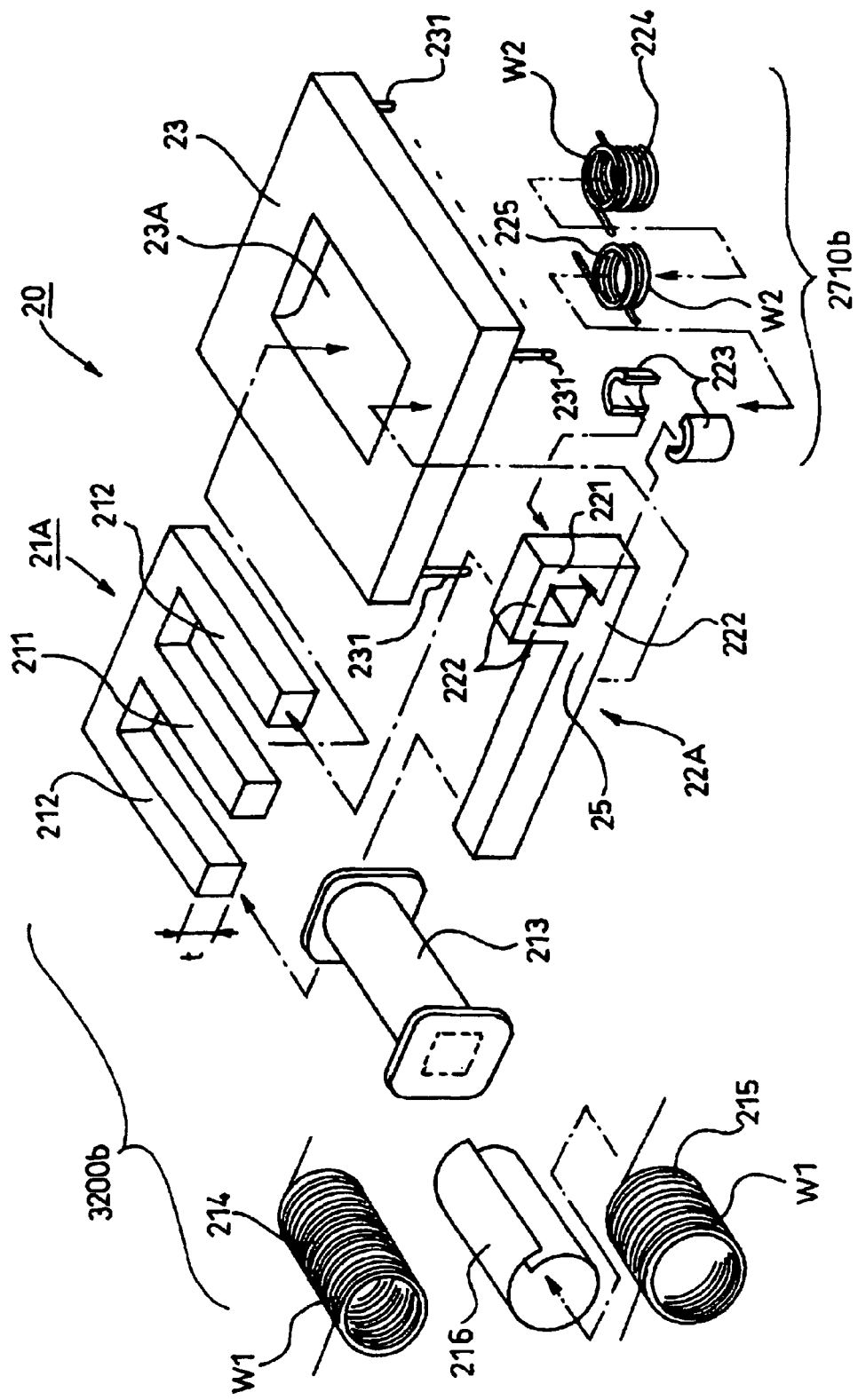
FIG. 17 is an exploded perspective view illustrating the transformer unit according to the second embodiment of the invention.

FIGS. 16 and 17 are perspective view and exploded perspective view illustrating a transformer unit 20 according to a fifth embodiment of the invention, respectively.

In the same manner as in the first embodiment, the transformer unit 20 is formed by integrating a switching transformer (large transformer) with another small transformer. In addition, the transformer unit 20 may be used as the switching transformer 3200 and the coupling transformer 2710 of the PLC modem shown in FIG. 13.

The transformer unit 20 shown in FIG. 16 or 17 is a vertical transformer unit that transforms an AC voltage of a power line. A switching transformer 3200b serving as a first transformer and a coupling transformer 2710b serving as a second transformer use a pedestal 23 in common. Further, in FIG. 16, reference numeral B21 indicates a magnetic path in the switching transformer 3200b and reference numeral B22 indicates a magnetic path in the coupling transformer 2710b.

As shown in FIG. 17, the switching transistor 3200b is configured to include an E-shaped core 21A, an I-shaped core 22A, the pedestal 23, a bobbin 213, primary coil 214 and secondary coil 215 formed of an electric wire W1, such as copper wires, wound on the bobbin 213, and an insulating sheet 216 provided between the primary coil 214 and the secondary coil 215. The E-shaped core 21A, the I-shaped core 22A, and the pedestal 23 are formed of a ferromagnetic material such as ferrite. In addition, the E-shaped core 21A and the I-shaped core 22A are fixed to each other by the use of a suitable material so as to be integrated with each other.

The E-shaped core 21A has a first leg part 211, which forms a first core on which the primary coil 214 and the secondary coil 215 are wound with the bobbin 213 interposed therebetween, and second leg parts 212, which form a first yoke used to create a closed magnetic path B21 together with the first leg part 211. In the same manner as in the first embodiment, the bobbin 213 having the primary coil 214 wound on an inner layer thereof and the secondary coil 215 wound on an outer layer thereof is disposed in the first leg part 111. The I-shaped core 22A and the second leg parts 212 form the first yoke. Thus, the magnetic path B21 of the switching transformer 3200b having the configuration described above is created mostly within the E-shaped core 21A and the I-shaped core 22A. In addition, the secondary coil 215 is covered with a sheet-shaped insulating material 210 (refer to FIG. 16) for safety.

The coupling transformer 2710b is configured to include the I-shaped core 22A, a bobbin 223, and primary coil 224 and secondary coil 225 formed of an electric wire W2 coated for insulation, such as a vinyl-coated electric wire. The bobbin 223 is disposed around a ring-shaped portion formed at an end portion of the I-shaped core 22A, and the primary coil 224 and the secondary coil 225 are wound on the disposed bobbin 223. In addition, the primary coil 224 and the secondary coil 225 may be electrically insulated from each other by the use of an insulating sheet, for example. The end portion of the I-shaped core 22A forms a second core 221 on which the primary coil 224 and the secondary coil 225 are wound with the bobbin 223 interposed therebetween and a second yoke 222 used to create a closed magnetic path together with the second core 221. In the same manner as in the first embodiment, the primary coil 224 and the secondary coil 225 are wound on the second core 221 so as to be parallel to each other in the horizontal direction. The magnetic path B22 of the coupling transformer 2710b having the configuration described above is created mostly within the I-shaped core 22A.

As is apparent from FIG. 16, in the transformer unit according to the present embodiment, the closed magnetic path B21 created by the switching transformer 3200b exists on a plane parallel to an X-Y plane, and the closed magnetic path B22 created by the coupling transformer 2710b exists on a plane parallel to an Y-Z plane. That is, magnetic fields of the two transformers are created on the planes perpendicular to each other. Accordingly, since both the planes are not parallel to each other, interference between the magnetic fields of the two transformers can be suppressed. In addition, even if the magnetic fields of the two transformers are not precisely perpendicular to each other, it is possible to suppress the interference between the magnetic fields by causing the magnetic fields not to be parallel to each other. In addition, the I-shaped core 22A forms both a part of the first yoke 212 and a part of the second yoke 222, and a common part 25 is a part where the closed magnetic path B21 and the closed magnetic path B22 are created. As described above, the entire transformer unit 10 can be made small.

As shown in FIG. 17, the E-shaped core 21A is mounted on an approximately central portion of the pedestal 23 and the I-shaped core 22A integrally fixed with the E-shaped core 21A is mounted on the vicinity of an edge of the pedestal 23. Moreover, connection terminals 231 protrude from a bottom surface of the pedestal 23, and the terminals 231 are connected to an electronic circuit on a substrate, for example. Furthermore, in the present embodiment, in order to make the transformer unit 20 thin, there is formed a recess 23A on the central portion of the pedestal 23, parts of the primary coil 214 and the secondary coil 215 of the switching transformer 3200b and a part of a flange of the bobbin 213 being placed in the recess 23A. However, the E-shaped core 21A may be formed such that a thickness t thereof is small (refer to FIG. 17).

As described above, the transformer unit 20 according to the present embodiment is also configured such that the plane (X-Y plane in FIG. 16) to which the closed magnetic path B21 belongs is not parallel to the plane (Y-Z plane in FIG. 16) to which the closed magnetic path B22 belongs. Accordingly, even when the same core that is integrally formed is used, a required efficient transforming operation can be realized without electrical interference between different magnetic fields. In addition, since at least a part of a yoke that creates a magnetic field is formed by the use of a common member, the entire transformer unit 20 can be made small. In addition, since a large transformer is formed in a horizontal manner, it is possible to make the entire transformer unit 20 small in the height direction thereof when mounting the entire transformer unit 20 on a substrate or the like.

Furthermore, in the transformer unit 20 shown in FIGS. 16 and 17, a core where the coupling transformer is formed is set as the I-shaped core 22A. However, an additional E-shaped core may be used instead of the I-shaped core 22A. That is, it is possible to use an E-shaped core having three leg parts corresponding to the first leg part 211 and the second leg parts 212 of the E-shaped core 21A, with the I-shaped core 22A shown in FIG. 17 as a connecting part.

Sixth Embodiment

Figure 18:
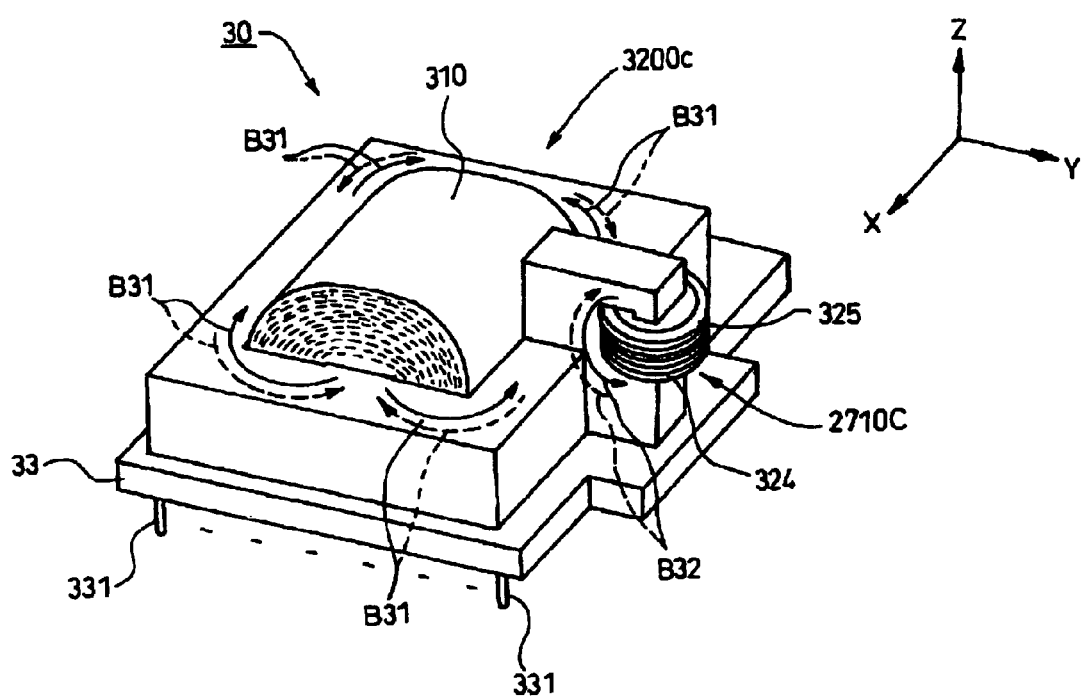
FIG. 18 is a perspective view illustrating a transformer unit according to a third embodiment of the invention.
Figure 19:
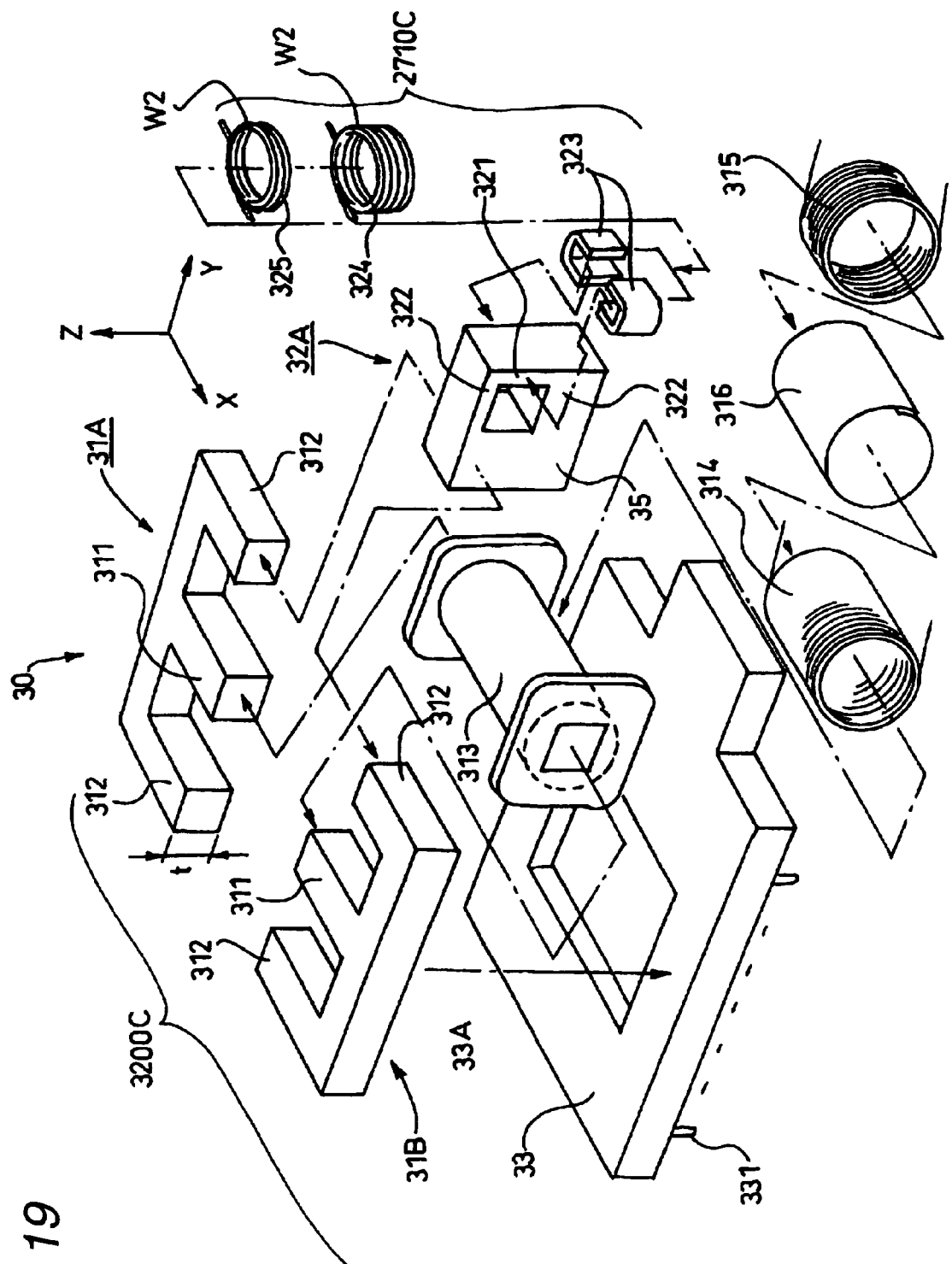
FIG. 19 is an exploded perspective view illustrating the transformer unit according to the third embodiment of the invention.

FIGS. 18 and 19 are perspective view and exploded perspective view illustrating a transformer unit 30 according to a sixth embodiment of the invention, respectively. In the same manner as in the fourth and fifth embodiments, the transformer unit 30 is formed by integrating a switching transformer for a power line communication apparatus with another small transformer. In addition, the transformer unit 30 may be used as the switching transformer 3200 and the coupling transformer 2710 of the PLC modem shown in FIG. 13.

The transformer unit 30 shown in FIGS. 18 and 19 is a vertical transformer unit that transforms an AC voltage of a power line. A switching transformer 3200c serving as a first transformer and a coupling transformer 2710c serving as a second transformer use a pedestal 33 in common. Further, in FIG. 18, reference numeral B31 indicates a magnetic path in the switching transformer 3200c and reference numeral B22 indicates a magnetic path in the coupling transformer 2710c.

As shown in FIG. 19, the switching transistor 3200c is configured to include a pair of E-shaped cores 31A and 31B having bilaterally symmetrical shapes, an I-shaped core 32A, a bobbin 313, primary coil 314 and secondary coil 315 formed of an electric wire W1, such as copper wires, wound on the bobbin 313, and an insulating sheet 316 provided between the primary coil 314 and the secondary coil 315. The E-shaped cores 31A and 31B, the I-shaped core 32A, and the pedestal 33 are formed of a ferromagnetic material such as ferrite. In addition, the E-shaped cores 31A and 31B and the I-shaped core 32A are fixed to each other by the use of a suitable material so as to be integrated with each other.

Each of the E-shaped cores 31A and 31B has a first leg part 311, which forms a first core on which the primary coil 314 and the secondary coil 315 are wound with the bobbin 313 interposed therebetween, and second leg parts 312, which form a first yoke used to create a closed magnetic path B21 together with the first leg part 311. The bobbin 313 having the primary coil 314 wound on an inner layer thereof and the secondary coil 315 wound on an outer layer thereof is disposed in the first leg part 311. The second leg parts 312 are provided on both sides with the first leg part 312 positioned therebetween, and one (closer to the I-shaped core 32A) of the second leg parts 312 is shorter than the other one by an amount of interposition of the I-shaped core 32A. The I-shaped core 32A has a size such that when the I-shaped core 32A is inserted into one of the second leg parts 312, the other one into which the I-shaped core 32A is not inserted protrudes from one of the second leg part 312. The I-shaped core 32A and the second leg parts 312 form the first yoke. Thus, the magnetic path B31 of the switching transformer 3200c having the configuration described above is created mostly within the E-shaped cores 31A and 31B and the I-shaped core 32A. In addition, the secondary coil 315 is covered with a sheet-shaped insulating material 310 (refer to FIG. 18) for safety.

The coupling transformer 2710c is configured to include the I-shaped core 32A, a bobbin 323, and primary coil 324 and secondary coil 325 formed of an electric wire W2 coated for insulation, such as a vinyl-coated electric wire. The bobbin 323 is disposed around a ring-shaped portion formed at an end portion of the I-shaped core 32A, and the primary coil 324 and the secondary coil 325 are wound on the disposed bobbin 323. In addition, the primary coil 324 and the secondary coil 325 may be electrically insulated from each other by the use of an insulating sheet, for example. The end portion of the I-shaped core 32A forms a second core 321 on which the primary coil 324 and the secondary coil 325 are wound with the bobbin 323 interposed therebetween and a second yoke 322 used to create a closed magnetic path together with the second core 321. In the same manner as in the first and second embodiments, the primary coil 324 and the secondary coil 325 are wound on the second core 321 so as to be parallel to each other in the horizontal direction. In addition, even in the coupling transformer 2710c, the electric wires W2 may be directly wound on the second core 321 without using the bobbin 323. In addition, the I-shaped core 32A is fixed to the E-shaped core 31A by the use of a suitable material (for example, solder) so as to be integrated with each other. The magnetic path B32 of the coupling transformer 2710c having the configuration described above is created mostly within the I-shaped core 32A.

As is apparent from FIG. 18, in the transformer unit according to the present embodiment, the closed magnetic path B31 created by the switching transformer 3200c exists on a plane parallel to an X-Y plane, and the closed magnetic path B32 created by the coupling transformer 2710c exists on a plane parallel to an Y-Z plane. That is, magnetic fields of the two transformers are created on the planes perpendicular to each other. Accordingly, since both the planes are not parallel to each other, interference between the magnetic fields of the two transformers can be suppressed. In addition, even if the magnetic fields of the two transformers are not precisely perpendicular to each other, it is possible to suppress the interference between the magnetic fields by causing the magnetic fields not to be parallel to each other. In addition, the I-shaped core 23A forms both a part of the first yoke 312 and a part of the second yoke 322, and a common part 35 is a part where the closed magnetic path B31 and the closed magnetic path B32 are created.

As shown in FIG. 19, the two E-shaped cores 31A and 31B fixed to each other are mounted on an approximately central portion of the pedestal 33 and the I-shaped core 32A integrally fixed with the E-shaped cores 31A and 31B is mounted on the vicinity of an edge of the pedestal 33. Moreover, connection terminals 331 protrude from a bottom surface of the pedestal 33, and the terminals 331 are connected to an electronic circuit on a substrate, for example. Furthermore, even in the present embodiment, in the same manner as in the second embodiment, in order to make the transformer unit 30 thin, there is formed a recess 33A on the central portion of the pedestal 33, parts of the primary coil 314 and the secondary coil 315 of the switching transformer 3200c and a part of a flange of the bobbin 313 being placed in the recess 33A. However, the E-shaped cores 31A and 31B may be formed such that a thickness t thereof is small (refer to FIG. 19).

As described above, the transformer unit 30 according to the present embodiment is also configured such that the plane (X-Y plane in FIG. 18) to which the closed magnetic path B31 belongs is not parallel to the plane (Y-Z plane in FIG. 18) to which the closed magnetic path B32 belongs. Accordingly, even when the same core that is integrally formed is used, a required efficient transforming operation can be realized without electrical interference between different magnetic fields. In addition, since at least a part of a yoke that creates a magnetic field is formed by the use of a common member, the entire transformer unit 30 can be made small. In addition, in the same manner as in the second embodiment, since a large transformer is formed in a horizontal manner, it is possible to make the entire transformer unit 30 small in the height direction thereof. Further, since only an opening enough to dispose the second core 321, the bobbin 323, and the coils 324 and 325 of the I-shaped core used to create the magnetic path B32 of the coupling transformer 2710c can be formed in a size only to protrude from the E-shaped core 311, the entire transformer unit 30 can be made even more small. Furthermore, in the case of the configuration described above, since magnetic fields of both the magnetic paths B31 and B32 are perpendicular to each other even though most of the magnetic path B32 crosses the magnetic path B31 of the switching transformer 3200c, the interference is small.

Seventh Embodiment

Figure 20:
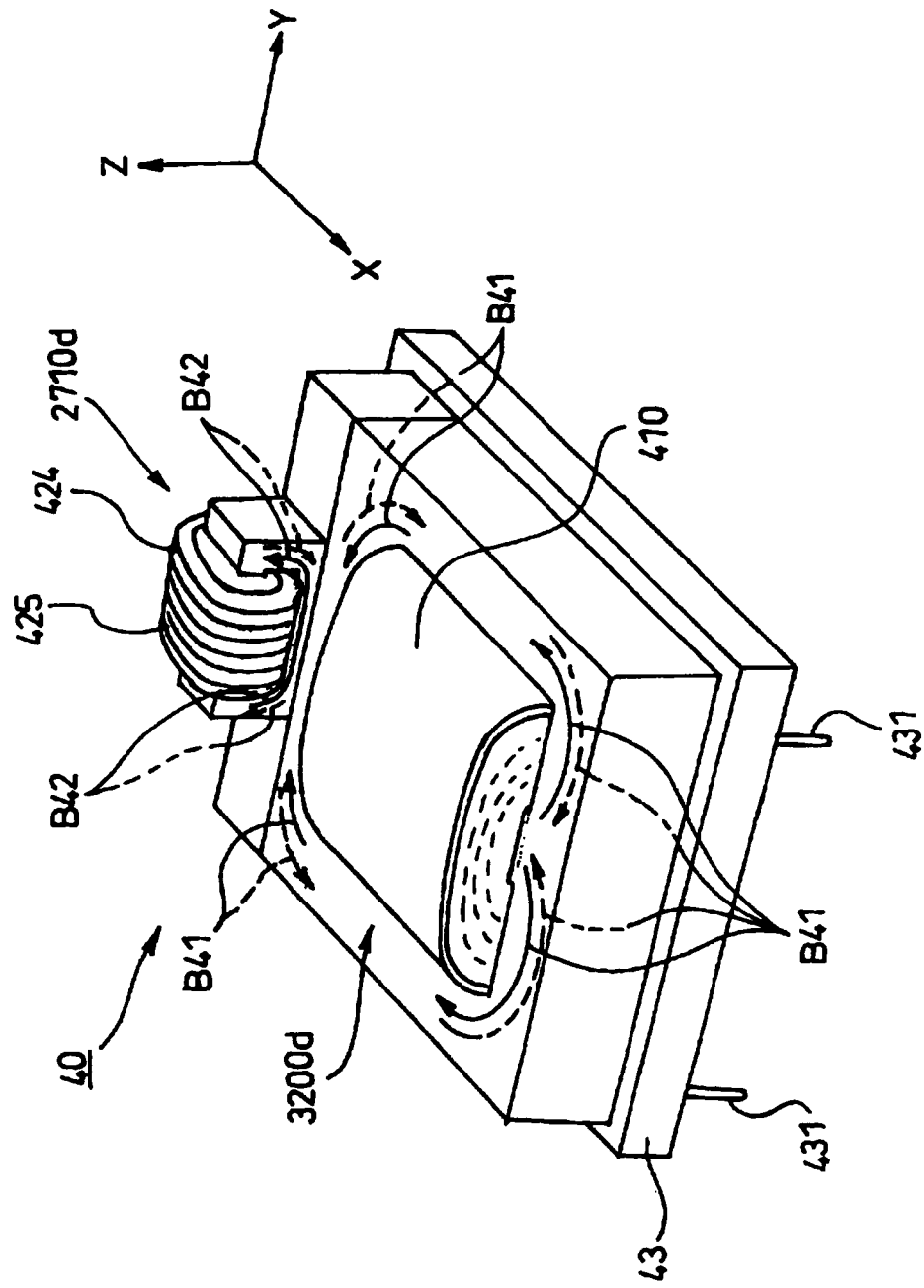
FIG. 20 is a perspective view illustrating a transformer unit according to a fourth embodiment of the invention.
Figure 21:
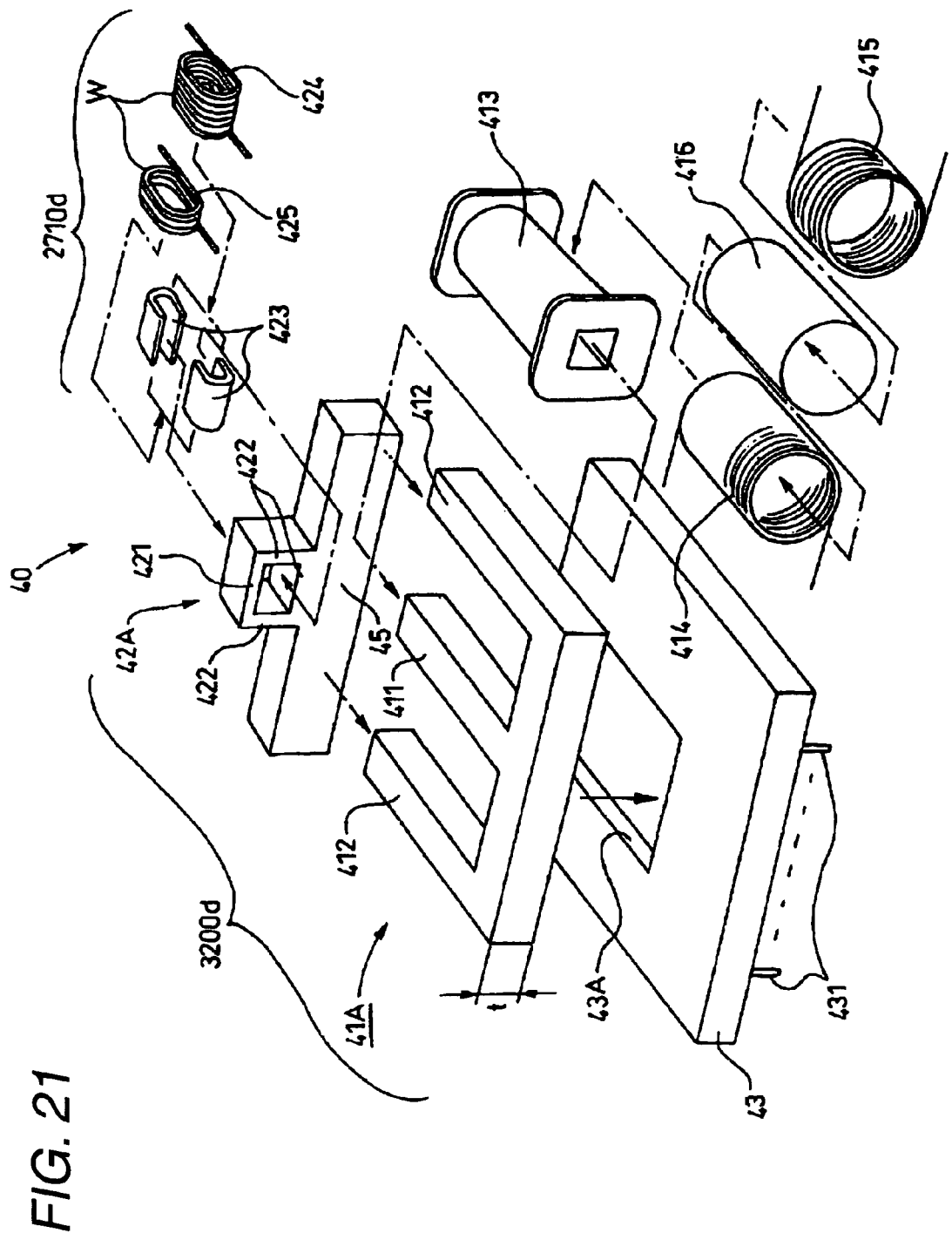
FIG. 21 is an exploded perspective view illustrating the transformer unit according to the fourth embodiment of the invention.

FIGS. 20 and 21 are perspective view and exploded perspective view illustrating a transformer unit 40 according to a seventh embodiment of the invention, respectively. In the same manner as in the first to third embodiments, the transformer unit 40 is formed by integrating a switching transformer for a power line communication apparatus with another small transformer. In addition, the transformer unit 40 may be used as the switching transformer 3200 and the coupling transformer 2710 of the PLC modem shown in FIG. 13.

The transformer unit 40 shown in FIG. 20 or 21 is a vertical transformer unit that transforms an AC voltage of a power line. A switching transformer 3200d serving as a first transformer and a coupling transformer 2710d serving as a second transformer use a pedestal 43 in common. Further, in FIG. 20, reference numeral B41 indicates a magnetic path in the switching transformer 3200d and reference numeral B42 indicates a magnetic path in the coupling transformer 2710d.

As shown in FIG. 21, the switching transistor 3200d is configured to include an E-shaped core 41A, an I-shaped core 42A, the pedestal 43, primary coil 414 and secondary coil 415 formed of an electric wire W1, such as copper wires, wound on a bobbin 413, and an insulating sheet 416 provided between the primary coil 414 and the secondary coil 415. The E-shaped core 41A, the I-shaped core 42A, and the pedestal 43 are formed of a ferromagnetic material such as ferrite. In addition, the E-shaped core 41A and the I-shaped core 42A are fixed to each other by the use of a suitable material so as to be integrated with each other.

The E-shaped core 41A has a first leg part 411, which forms a first core on which the primary coil 414 and the secondary coil 415 are wound with the bobbin 413 interposed therebetween, and second leg parts 412, which forms a first yoke used to create a closed magnetic path B41 together with the first leg part 411. In the same manner as in the first to third embodiments, the bobbin 413 having the primary coil 414 wound on an inner layer thereof and the secondary coil 415 wound on an outer layer thereof is disposed in the first leg part 411. The I-shaped core 42A and the second leg parts 412 form the first yoke. The magnetic path B41 of the switching transformer 3200d having the configuration described above is created mostly within the E-shaped core 41A and the I-shaped core 42A. In addition, the secondary coil 415 is covered with a sheet-shaped insulating material 410 (refer to FIG. 20) for safety.

The coupling transformer 2710d is configured to include the I-shaped core 42A, a bobbin 423, and primary coil 424 and secondary coil 425 formed of an electric wire W2 coated for insulation, such as a vinyl-coated electric wire. The bobbin 423 is disposed around a ring-shaped portion formed at a central portion of the I-shaped core 42A, and the primary coil 424 and the secondary coil 425 are wound on the disposed bobbin 423. In addition, the primary coil 424 and the secondary coil 425 may be electrically insulated from each other by the use of an insulating sheet, for example. The ring-shaped portion of the I-shaped core 42A forms a second core 421 on which the primary coil 424 and the secondary coil 425 are wound with the bobbin 423 interposed therebetween and a second yoke 422 used to create a closed magnetic path together with the second core 421. In the same manner as in the first to third embodiments, the primary coil 424 and the secondary coil 424 are wound on the second core 421 so as to be parallel to each other in the horizontal direction. In addition, even in the coupling transformer 2710d, the electric wires W2 may be directly wound on the second core 421 without using the bobbin 423.

As is apparent from FIG. 20, in the transformer unit according to the present embodiment, the closed magnetic path B41 created by the switching transformer 3200d exists on a plane parallel to an X-Y plane, and the closed magnetic path B42 created by the coupling transformer 2710d exists on a plane parallel to an Y-Z plane. Accordingly, since both the planes are not parallel to each other, interference between the magnetic fields of the two transformers can be suppressed. In addition, even if the magnetic fields of the two transformers are not precisely perpendicular to each other, it is possible to suppress the interference between the magnetic fields by causing the magnetic fields not to be parallel to each other. In addition, the I-shaped core 42A forms both a part of the first yoke 412 and a part of the second yoke 422, and a common part 45 is a part where the closed magnetic path B41 and the closed magnetic path B42 are created.

As shown in FIG. 21, the E-shaped core 41A is mounted on an approximately central portion of the pedestal 43 and the I-shaped core 42A integrally fixed with the E-shaped core 41A is mounted on the vicinity of an edge of the pedestal 43. Moreover, connection terminals 431 protrude from a bottom surface of the pedestal 43, and the terminals 331 are connected to an electronic circuit on a substrate, for example. Furthermore, even in the present embodiment, in order to make the transformer unit 40 thin, there is formed a recess 43A on the central portion of the pedestal 43, parts of the primary coil 414 and the secondary coil 415 of the switching transformer 3200d and a part of a flange of the bobbin 413 being placed in the recess 43A. However, the E-shaped core 41A may be formed such that a thickness t thereof is small (refer to FIG. 21).

As described above, the transformer unit 40 according to the present embodiment is also configured such that the plane (X-Y plane in FIG. 2) to which the closed magnetic path B41 belongs is not parallel to the plane (Y-Z plane in FIG. 20) to which the closed magnetic path B42 belongs. Accordingly, even when the same core that is integrally formed is used, a required efficient transforming operation can be realized without electrical interference between different magnetic fields. In addition, since at least a part of a yoke that creates a magnetic field is formed by the use of a common member, the entire transformer unit 40 can be made small. In addition, since a large transformer is formed in a horizontal manner, it is possible to make the entire transformer unit 40 small in the height direction thereof when mounting the entire transformer unit 40 on a substrate or the like, in the same manner as in these and third embodiments. Moreover, since the ring-shaped portion of the I-shaped core 42A included in the coupling transformer 2710d is formed in the central portion of the I-shaped core 42A so as to protrude upward, a planar area does not increase as compared with a planar area in the case when there is only the switching transformer 3200d. In addition, even in the height direction, since the ring-shaped portion of the I-shaped core 42A protrudes from a portion of the switching transformer 3200d where the bobbin 413 is disposed, it is possible to prevent a mounting area from increasing due to mounting onto a substrate or the like.

Further, in the transformer unit 40 shown in FIGS. 20 and 21, a core where the coupling transformer is formed is set as the I-shaped core 42A. However, an additional E-shaped core may be used instead of the I-shaped core 42A. That is, it is possible to use an E-shaped core having three leg parts corresponding to the first leg part 411 and the second leg parts 412 of the E-shaped core 41A, with the I-shaped core 42A shown in FIG. 21 as a connecting part.

Eighth Embodiment

Figure 22:
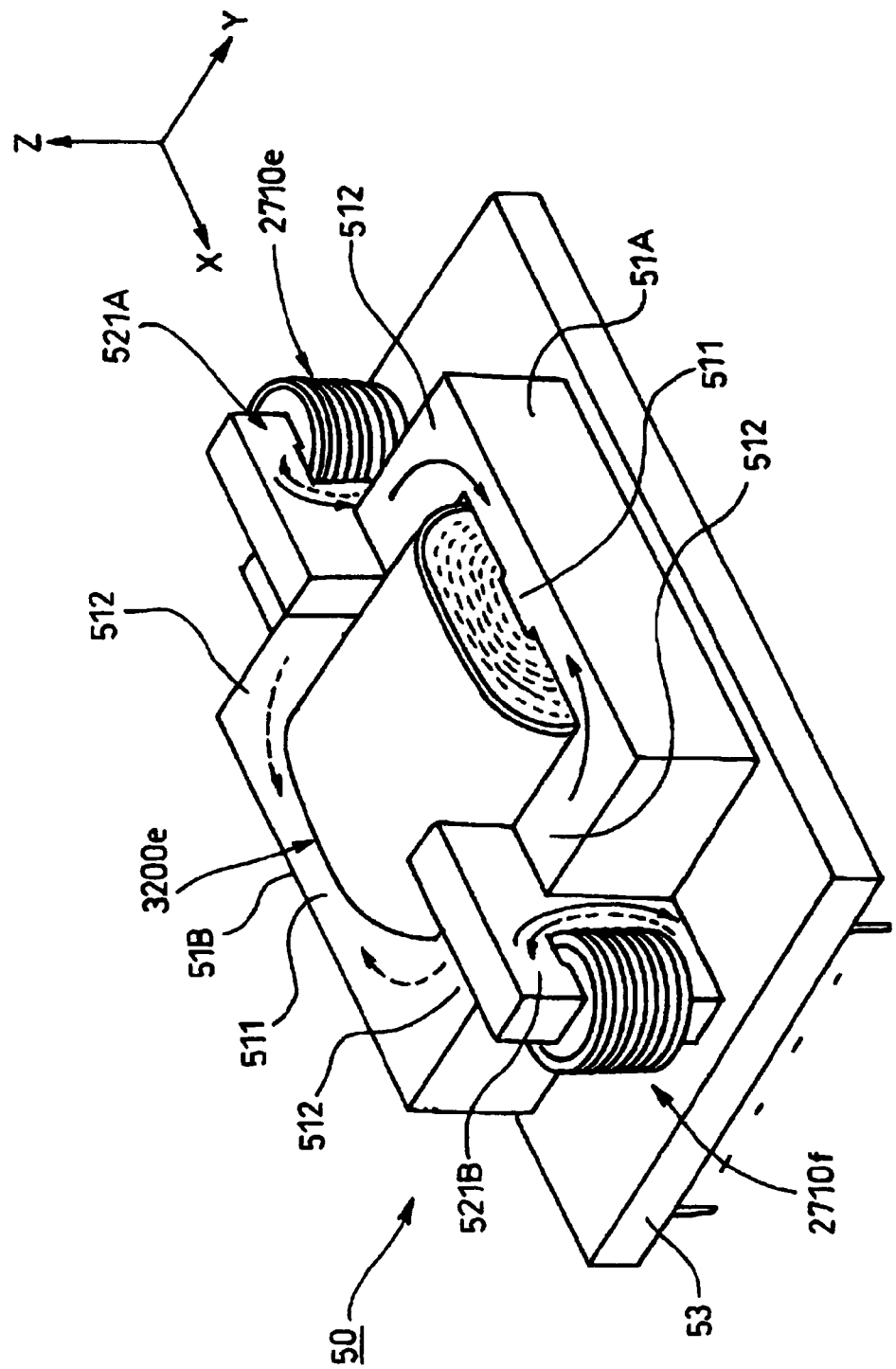
FIG. 22 is a perspective view illustrating a transformer unit according to a fifth embodiment of the invention.

FIG. 22 is a perspective view illustrating a transformer unit 50 according to an eighth embodiment. In the same manner as in the fourth to seventh embodiments, the transformer unit 50 is formed by integrating a switching transformer (large transformer) for a power line communication apparatus with another small transformer. In addition, the transformer unit 50 may be used as the switching transformer 3200 and the coupling transformer 2710 of the PLC modem shown in FIG. 13.

The transformer unit 50 shown in FIG. 22 includes a large transformer (for example, switching transformer) 3200e, which is disposed on a central portion of a pedestal 53, and small transformers (for example, coupling transformers) 2710e and 2710f, which are disposed at sides of second leg parts 512 that form yokes provided on both sides of a first leg part 511 that forms a core of the large transformer 3200e. Specifically, since the transformer unit 50 shown in FIG. 22 can be realized by providing an additional coupling transformer in the transformer unit 30 according to the third embodiment shown in FIGS. 18 and 19, a detailed explanation will be omitted. That is, in the transformer unit 30 shown in FIGS. 18 and 19, the coupling transformer 2710c is formed by providing the I-shaped core 32A in one of the second leg parts of the E-shaped cores 31A and 31B However, in the present embodiment, additional small transformers 2710e and 2710f are formed by providing I-shaped cores, which have the same shape as the I-shaped core 32A in the third embodiment, in the second leg parts of both the E-shaped cores 51A and 51B. In the transformer unit having the configuration described above, in the same manner as in the transformer unit 30 according to the third embodiment, magnetic fields of the large transmission 3200e and small transformers 2710e and 2710f do not magnetically interfere with each other. Accordingly, even when the same core that is integrally formed is used, a required efficient transforming operation can be realized. In addition, since at least a part of a yoke that creates a magnetic field is formed by the use of a common member, the entire transformer unit 50 can be made small.

Moreover, it is possible to integrate a more number of small transformers by increasing the number of yokes around a core.

Furthermore, the invention is not limited to the above embodiments and various modifications may be made without departing from the spirit and scope of the invention.

In addition, in the first to fifth embodiments, it has been described about a case in which a plane to which a closed magnetic path created by a switching transformer belongs is perpendicular to a plane to which a closed magnetic path created by a coupling transformer belongs. In this case, if the planes are not perpendicular to each other, an effect of suppressing the interference can be obtained.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based upon and claims the benefit of priorities of Japanese Patent Application Nos. 2005-377967 filed on Dec. 28, 2005 and 2006-118070 filed on Apr. 21, 2006, the contents of which are incorporated herein by reference in its entirety.

The AC adaptor and the power line communication system according to the embodiments of the invention are advantageous in that even when a power line communication apparatus, such as an imaging device or an image display device, is disposed at a place distant from an outlet, the power line communication can be performed while suppressing unnecessary radiation occurring in a cable. In particular, the invention is effective for a case of disposing an imaging device at a place distant from an outlet for the purpose of crime prevention and security.

The invention claimed is:

1. A power supplying apparatus, comprising:
a plug configured to be connected to a power line;
a DC cable configured to be connected to a power line communication apparatus, the power line communication apparatus for transmitting a transmission signal through the power line;
a voltage converting circuit that converts an AC voltage, which is input from the power line through the plug, to a DC voltage and outputs the DC voltage to the DC cable, wherein the transmission signal is superimposed on the DC voltage on the DC cable;
a separation circuit that receives the transmission signal superimposed on the DC voltage and separates the transmission signal from the DC voltage to provide a separated transmission signal;
an amplifier circuit that receives the separated transmission signal from the separation circuit and amplifies a level of the separated transmission signal to provide an amplified transmission signal; and
a coupling circuit that superimposes the amplified transmission signal on the AC voltage on the power line.

2. The power supplying apparatus according to claim 1, wherein the coupling circuit includes a transformer having a primary coil connected to the plug and a secondary coil connected to the DC cable, and a turn ratio of the primary coil with respect to the secondary coil is larger than one.

3. The power supplying apparatus according to claim 1, wherein the level of the transmission signal includes at least one of power, voltage, and current.

4. The power supplying apparatus according to claim 1, further comprising: an AC cable used to connect the power line and the plug with each other, wherein the AC cable is shorter than the DC cable.

5. The power supplying apparatus according to claim 1, further comprising: a body including the voltage converting circuit, the separation circuit, the amplifier circuit and the coupling circuit therein, wherein the plug is provided on the body.

6. The power supplying apparatus according to claim 1, further comprising: a body including the voltage converting circuit, the separation circuit, the amplifier circuit and the coupling circuit therein; and an outlet provided in the body.

7. A power line communication system comprising: the power supplying apparatus according to claim 1; and the power line communication apparatus, wherein the power line communication apparatus includes a power line communication modem to which a DC voltage from the DC cable is supplied and which transmits the transmission signal to the power supplying apparatus through the DC cable.

8. The power line communication system according to claim 7, wherein the transmission signal includes image data, the power line communication apparatus includes an imaging device that images a photographic subject and outputs the image data to the power line communication modem, and the power line communication modem outputs the input image data, as the transmission signal, to the power supplying apparatus through the DC cable.

9. The power line communication system according to claim 7, wherein the power line communication modem is connectable to the power line and includes a transformer unit that transforms an AC voltage of the power line, the transformer unit includes a first transformer and a second transformer different from the first transformer, the first transformer has a first core, on which electric wires are wound, and a first yoke that creates a closed magnetic path together with the first core, the second transformer has a second core, on which other electric wires different from the electric wires are wound, and a second yoke that creates a closed magnetic path together with the second core, and the first yoke and the second yoke have a common part that creates at least a part of a closed magnetic path created by the first transformer and at least a part of a closed magnetic path created by the second transformer and are disposed such that a plane to which the closed magnetic path created by the first transformer belongs and a plane to which the closed magnetic path created by the second transformer belongs are not parallel to each other.

10. The power line communication system according to claim 9, wherein the first yoke and the second yoke are disposed such that the plane to which the closed magnetic path created by the first transformer belongs and the plane to which the closed magnetic path created by the second transformer belongs are approximately perpendicular to each other.

11. A power supplying apparatus, comprising:
a plug configured to be connected to a power line that includes a reception signal superimposed on an AC signal;
a DC cable configured to be connected to a power line communication apparatus, the power line communication apparatus for receiving the reception signal through the DC cable from the power line;
a voltage converting circuit that converts the AC voltage, which is input from the power line through the plug, to a DC voltage and outputs the DC voltage to the DC cable;
a coupling circuit that receives the reception signal superimposed on the AC voltage and separates the reception signal from the AC voltage to provide a separated reception signal;
an attenuator circuit that attenuates the level of the separated reception signal to provide an attenuated reception signal; and
a superimposition circuit that superimposes the attenuated reception signal on the DC voltage.

12. The power supplying apparatus according to claim 11, wherein the coupling circuit includes a transformer having a primary coil connected to the plug and a secondary coil connected to the DC cable, and a turn ratio of the secondary coil with respect to the primary coil is smaller than one.

13. The power supplying apparatus according to claim 11, wherein the level of the received signal includes at least one of power, voltage, and current.

14. The power supplying apparatus according to claim 11, further comprising: an AC cable used to connect the power line and the plug with each other, wherein the AC cable is shorter than the DC cable.

15. The power supplying apparatus according to claim 11, further comprising: a body including the voltage converting circuit, the coupling circuit, the attenuator circuit and the superimposition circuit therein, wherein the plug is provided on the body.

16. The power supplying apparatus according to claim 11, further comprising: a body including the voltage converting circuit, the coupling circuit, the attenuator circuit and the superimposition circuit therein; and an outlet provided in the body.

17. A power line communication system comprising: the power supplying apparatus according to claim 11; and the power line communication apparatus, wherein the power line communication apparatus includes a power line communication modem to which a DC voltage from the DC cable is supplied and which receives the received signal from the power supplying apparatus through the DC cable.

18. The power line communication system according to claim 17, wherein the power line communication modem is connectable to the power line and includes a transformer unit that transforms an AC voltage of the power line, the transformer unit includes a first transformer and a second transformer different from the first transformer, the first transformer has a first core, on which electric wires are wound, and a first yoke that creates a closed magnetic path together with the first core, the second transformer has a second core, on which other electric wires different from the electric wires are wound, and a second yoke that creates a closed magnetic path together with the second core, and the first yoke and the second yoke have a common part that creates at least a part of a closed magnetic path created by the first transformer and at least a part of a closed magnetic path created by the second transformer and are disposed such that a plane to which the closed magnetic path created by the first transformer belongs and a plane to which the closed magnetic path created by the second transformer belongs are not parallel to each other.

19. The power line communication system according to claim 18, wherein the first yoke and the second yoke are disposed such that the plane to which the closed magnetic path created by the first transformer belongs and the plane to which the closed magnetic path created by the second transformer belongs are approximately perpendicular to each other.

20. The power line communication system according to claim 11, wherein the received signal includes image data used to display an image, the power line communication apparatus includes an image display device that displays the image, and the power line communication modem outputs to the image display device the received signal input through the DC cable.

21. A signal relaying method in a power supplying apparatus for supplying power to a power line communication apparatus, the power supplying apparatus converting an AC voltage to a DC voltage, the power line communication apparatus transmitting a transmission signal through the power supplying apparatus to a power line, the method comprising:
separating the transmission signal superimposed on a DC voltage to provide a separated transmission signal;
amplifying a level of the separated transmission signal to provide an amplified transmission signal; and
superimposing the amplified transmission signal on the AC voltage.

22. A signal relaying method in a power supplying apparatus for supplying power to a power line communication apparatus, the power supplying apparatus converting an AC voltage to a DC voltage, the power line communication apparatus receiving a reception signal superimposed on the AC voltage through the power supplying apparatus from a power line, the method comprising:
separating the reception signal superimposed on the AC voltage to provide a separated reception signal;
attenuating the level of the separated reception signal; and
superimposing the attenuated reception signal on the DC voltage.

* * * * *